US012125547B2

(12) United States Patent
Chen et al.

(10) Patent No.: US 12,125,547 B2
(45) Date of Patent: *Oct. 22, 2024

(54) FUSE BASED REPLAY PROTECTION WITH DYNAMIC FUSE USAGE AND COUNTERMEASURES FOR FUSE VOLTAGE CUT ATTACKS

(71) Applicant: Microsoft Technology Licensing, LLC, Redmond, WA (US)

(72) Inventors: Ling Tony Chen, Bellevue, WA (US); Felix Domke, Lübeck (DE); Ankur Choudhary, Redmond, WA (US); Bradley Joseph Litterell, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,625

(22) Filed: Jul. 13, 2023

(65) Prior Publication Data
US 2024/0071543 A1    Feb. 29, 2024

Related U.S. Application Data

(63) Continuation of application No. 17/655,447, filed on Mar. 18, 2022, now Pat. No. 11,776,646, which is a
(Continued)

(51) Int. Cl.
*G11C 29/00* (2006.01)
*G11C 29/02* (2006.01)

(52) U.S. Cl.
CPC .................. *G11C 29/027* (2013.01)

(58) Field of Classification Search
CPC .................................................. G11C 29/027
See application file for complete search history.

(56) References Cited

U.S. PATENT DOCUMENTS

| 2004/0066695 A1* | 4/2004 | Anand ............... G11C 29/027 365/201 |
| 2007/0130470 A1 | 6/2007 | Blom et al. |

(Continued)

OTHER PUBLICATIONS

"Notice of Allowance Issued in U.S. Appl. No. 17/219,459", Mailed Date: Aug. 17, 2023, 11 Pages.

*Primary Examiner* — Mohammed A Bashar

(57) ABSTRACT

A TPM with programmable fuses in an SOC includes an on-die RAM storing a blown-fuse count and a TPM state read from off-die NV memory. During initialization, if the blown-fuse count is greater than a TPM state fuse count, a TPM state PIN-attempt-failure count is incremented, thereby thwarting a replay attack. If a PIN satisfies a PIN failure policy, and if a TPM state previously-passed-PIN indicator is set to true, a fuse is blown and the blown-fuse count incremented depending on the PIN being incorrect, but if the TPM state previously-passed-PIN indicator is set to false, a fuse is blown and the blown-fuse count incremented independent of whether the PIN is correct or incorrect. The TPM state fuse count is set equal to the blown-fuse count. If a counter cleared before processing the PIN remains cleared during the next initialization, a fuse voltage cut is detected and a penalty imposed.

20 Claims, 14 Drawing Sheets

Related U.S. Application Data continuation of application No. 17/219,308, filed on Mar. 31, 2021, now Pat. No. 11,302,411.

(56) References Cited

U.S. PATENT DOCUMENTS

| | | |
|---|---|---|
| 2018/0076136 A1* | 3/2018 | Iwamoto ................ G11C 17/16 |
| 2022/0198072 A1 | 6/2022 | Strong |
| 2023/0237154 A1 | 7/2023 | Chen et al. |

* cited by examiner

FUSE BASED REPLAY PROTECTION WITH DYNAMIC FUSE USAGE AND COUNTERMEASURES FOR FUSE VOLTAGE CUT ATTACKS

CROSS-REFERENCE TO RELATED APPLICATIONS

This application a is a continuation of U.S. application Ser. No. 17/655,447 filed Mar. 18, 2022, which is a continuation of U.S. application Ser. No. 17/219,308 filed on Mar. 31, 2021, now Issued U.S. Pat. No. 11,302,411 entitled "Fuse based replay protection with dynamic fuse usage and countermeasures for fuse voltage cut attacks," which applications are incorporated herein by reference in the entireties. To the extent appropriate a claim of priority is made.

U.S. application Ser. No. 17/219,308 is related to U.S. patent application Ser. No. 17/219,392 entitled "FUSE BASED REPLAY PROTECTION WITH CONSERVATIVE FUSE USAGE," and to U.S. patent application Ser. No. 17/219,459 entitled "FUSE BASED REPLAY PROTECTION WITH AGGRESSIVE FUSE USAGE AND COUNTERMEASURES FOR FUSE VOLTAGE CUT ATTACKS," both of which are filed on the same date herewith and incorporated by reference in their entirety herein.

BACKGROUND

A trusted platform module (TPM) may be configured to provide security-related functions involving cryptographic keys for a host computing system (e.g., a computer, smart phone, etc.). TPMs may hold the sensitive keys and release them only when a correct personal identification number (PIN) is provided by a user. As such, a TPM may be utilized to prevent "PIN hammering" attacks, where an attacker repeatedly tries PIN combinations of a PIN space until a correct PINs is tried, thereby causing the TPM to release the key and providing system access to the attacker. This attack method works especially well on short 4-digit numeric PINs that are often used for protection. To combat this method of attack, the TPM may implement replay protection measures that keep track of how many times an incorrect PIN is entered, and clear the held key when the number of PIN attempt failures exceeds a specified threshold.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer readable mediums that store code for performing the methods are described herein. In one aspect, a method for thwarting PIN retry attacks in a TPM is implemented in a system on a chip (SOC). The SOC comprises a plurality of programmable fuses and an on-die random access memory (RAM). The on-die RAM stores a blown-fuse count comprising a count of currently blown fuses of the plurality of programmable fuses and a TPM state. The TPM state comprises a TPM state fuse count, a TPM state PIN-attempt-failure count, and a TPM state previously-passed-PIN indicator. The method comprises initializing the TPM. Initializing the TPM comprises at least, in response to the blown-fuse count being greater than the TPM state fuse count, incrementing the TPM state PIN-attempt-failure count. The method further comprises receiving a PIN in a PIN attempt for accessing a system protected by the TPM. In response to the TPM state PIN-attempt-failure count satisfying a PIN-attempt-failure count policy, the method comprises: in response to the TPM state previously-passed-PIN indicator being set to true, blowing a fuse and incrementing the blown-fuse count in response to the received PIN being incorrect, or in response to the TPM state previously-passed-PIN indicator being set to false, blowing a fuse and incrementing the blown-fuse count independent of whether the received PIN is determined to be correct or incorrect. The method further comprises setting the TPM state fuse count based on the blown-fuse count, and returning a PIN attempt result.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
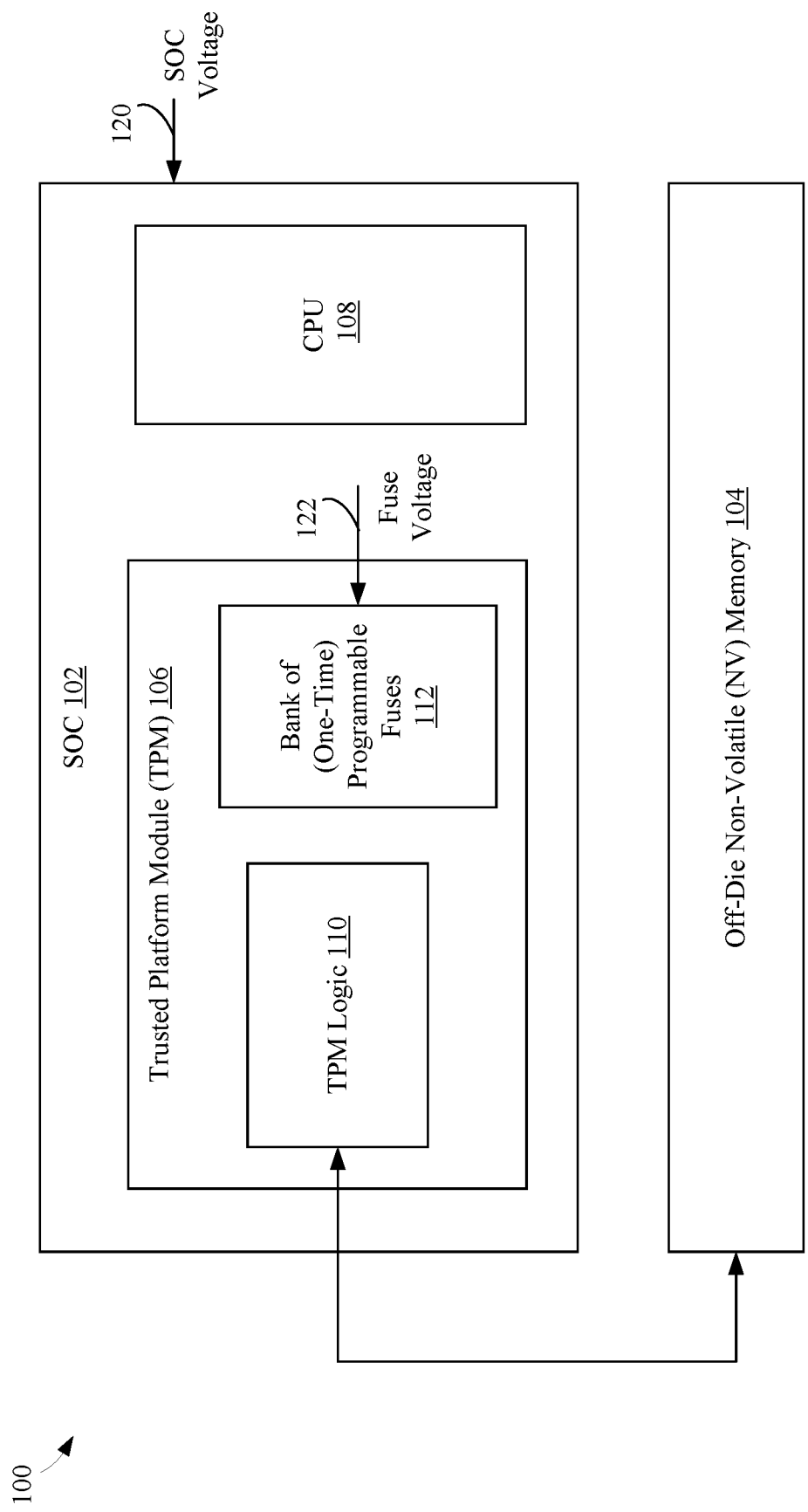
FIG. 1 is a block diagram of a system comprising a TPM implemented on a SOC for verifying PIN entries and protecting against PIN hammering attacks, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As described above, a TPM may be configured to provide security-related functions involving cryptographic keys. The TPM may hold the sensitive keys (e.g., long cryptographic keys) and release a key when a correct corresponding PIN is provided by a user. A TPM may be configured to prevent "PIN hammering" attacks, where an attacker repeatedly tries PIN combinations to find a correct PIN, by implementing replay protection measures that keep track of how many times an incorrect PIN is entered. The cryptographic key may be cleared when the number of PIN attempt failures exceeds a specified threshold, for example, according to a PIN attempt failure policy of the TPM. The replay protection measures may be relatively easy to implement on a discrete TPM chip (e.g., a system on a chip (SOC)) that has embedded non-volatile (NV) flash memory to record and preserve PIN attempt failure counts. However, it may be uneconomical to add NV flash memory to a large SOC die (e.g., an SOC built on leading-edge process nodes that has an on-die CPU) to support an embedded security processor used as the TPM. Without any form of "long term memory" on the SOC die to record how many PIN attempt failures have occurred, an attacker can try a presumably safe number of PIN combinations, and then reset the SOC to a previous state in which the PIN tries were not yet recorded (e.g., replay an earlier state that had a lower number of PIN tries recorded). The attacker may then try more PINs. By repeating this "replay" process, the attacker can eventually enumerate an entire PIN space to release one or more keys and steal the PINs authorized in the TPM.

The methods and systems described herein provide PIN attack countermeasures, which may be applied to large SOCs comprising an on-die CPU, using one-time programmable fuses that can be blown within the SOC. The fuses provide large SOCs, such as those on leading edge process nodes (e.g., 7 nm process), a way to permanently record a state of the TPM (e.g., how many PIN attempt failures have occurred). As fuses can be very expensive, both economically and in terms of SOC die area, they may not be reasonably allocated in large quantities. Methods are provided herein that utilize fuses in a conservative manner, which makes it practical to implement a TPM embedded within a large SOC, and provide effective "PIN hammering" countermeasures.

The present disclosure describes three embodiments of a TPM that may be embedded on an SOC, where each embodiment utilizes a plurality of programmable fuses (e.g., one-time programmable fuses) for protecting the TPM from PIN hammering attacks (e.g., replay attacks and/or voltage draw attacks). For example, the TPM may blow fuses during authentication of PIN entries, where the number of blown fuses functions as a counter. The first embodiment may be referred to as FUSE BASED REPLAY PROTECTION WITH CONSERVATIVE FUSE USAGE. In this first embodiment a fuse is utilized depending on whether an incorrect PIN has been entered for access to a system protected by the TPM. The second embodiment may be referred to as FUSE BASED REPLAY PROTECTION WITH AGGRESSIVE FUSE USAGE AND FUSE VOLTAGE CUT COUNTERMEASURES. In this second embodiment a fuse may be utilized for each PIN entry attempt, independent of whether the entered PIN is correct or incorrect. The third embodiment may be referred to as FUSE BASED REPLAY PROTECTION WITH DYNAMIC FUSE USAGE AND FUSE VOLTAGE CUT COUNTERMEASURES. In this third embodiment the TPM dynamically determines whether to apply the conservative fuse utilization method or the aggressive fuse utilization method depending on the status of prior PIN entry attempts (e.g., whether a currently entered PIN has previously passed a PIN verification test in response to a PIN entry attempt, i.e., was previously verified as a correct PIN). In addition describing the three embodiments with respect to FIGS. 1-16, an example of each embodiment is provided in pseudo-code below in section II., D.

Fuse based replay protection may be implemented in various ways. For example, FIG. 1 is a block diagram 100 of a system comprising a trusted platform module (TPM) implemented on a system on a chip (SOC) for verifying PIN entries and protecting against PIN hammering attacks, according to an example embodiment. As shown in FIG. 1, system 100 comprises a SOC 102, an off-die non-volatile (NV) memory 104, a TPM 106, a central processing unit (CPU) 108, an SOC voltage 120, and a fuse voltage 122. TPM 106 comprises TPM logic 110 and a plurality of programmable fuses 112. System 100 is described in detail as follows.

SOC 102 may comprise an integrated circuit having various components on a substrate or microchip. For example SOC 102 may integrate a microcontroller, microprocessor (e.g., CPU 108), and/or one or more processing cores with on-die random access memory devices, input/output ports (not shown), and may include one or more peripherals (e.g., a graphic processing unit (GPU), Wi-Fi and cellular network radio modems, etc.). SOC 102 may comprise TPM 106, which may be communicatively coupled to an external long-term memory, such as off-die NV memory 104. TPM 106 may comprise plurality of programmable fuses 112 that may be utilized as an on-die long-term counter. TPM 106 may be configured to execute TPM logic 110, to verify PIN entries, blow fuses of the plurality of programmable fuses 112, and write/read TPM states to/from off-die NV memory 104. Although the embodiments described herein with respect to FIGS. 1-16 refer to a TPM or TPM logic, any other suitable system and/or logic that utilizes a PIN, entered by a user to release or authorize usage of a long cryptographic key, may perform the embodiments described herein and may be referred to as a TPM and/or TPM logic herein. Moreover, although the embodiments described herein with respect to FIGS. 1-16 refer to PINs (personal identification numbers), the embodiments described herein may apply to any suitable passwords or passcodes comprising any suitable characters or symbols, which may be referred to herein as a PIN.

SOC 102 may comprise one or more pins for providing power to SOC 102 and various components on the SOC. For example, SOC voltage 120 and fuse voltage 122 may be provided on one or more pins of SOC 102. Fuse voltage 122 may be configured to provide power to blow a fuse of the plurality of programmable fuses 112.

Although the embodiments described herein comprise a TPM 106 implemented on an SOC 102 (as described with respect to FIGS. 1-16), TPM 106 may also be implemented in other types of devices such as a computing device comprising a traditional motherboard-based computer architecture. Such a computing device may have components that are separated based on function and that are connected through a central interfacing circuit board. For example, as described in more detail below with respect to FIG. 16, the TPM system may be implemented in a computing device 1600, which may comprise any suitable computing device, such as a stationary computing device (e.g., a desktop computer or personal computer), a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system; a Microsoft® Windows phone, etc.), a wearable computing device (e.g., a head-mounted device including smart glasses such as Google® Glass™, Oculus Rift® by Oculus VR, LLC, etc.), a gaming console/system (e.g., Nintendo Switch®, etc.), an appliance, a set top box, etc.

The plurality of programmable fuses 112 may comprise a bank of one-time programmable fuses. For example, the plurality of programmable fuses 112 may be configured as a programmable read-only memory and utilized as a counter, where the setting of each bit of the counter is locked by a fuse or anti-fuse. Count data stored in the plurality of programmable fuses 112 may be permanent. In one example, fuses of the plurality of programmable fuses 112 may blown one by one, where a fuse counter value may comprise an integer between zero through the number of available fuses to represent the state of the fuse bank. In some embodiments, the fuse counter value may be incremented (by blowing a fuse) but may not be decremented.

Plurality of programmable fuses 112 may receive extra power from fuse voltage 122 to blow a fuse. TPM logic 110 may attempt to blow fuses of plurality of programmable fuses 112 to increment the fuse counter. However, an attacker may be able to control voltage input to the SOC including to the pin that supplies fuse voltage 122. Thus the attacker may have the ability to detect extra power being drawn for fuse voltage 122, which may signal an attempt to blow a fuse by the TPM, and may immediately cut the power to prevent the fuse from being blown. Fuse based methods are provided herein for preventing replay attacks by combatting this type of fuse voltage cut attack.

Off-die NV memory 104 comprises NV storage that is external to SOC 102 and available to TPM logic 110 for storing TPM 106 state information. TPM logic 110 may encrypt and integrity protect the state information that is saved to off-die NV memory 104 to prevent the disclosure or modification of the state information. Although the state information may be encrypted, an attacker may be able to replay previously signed state information in TPM 106, by copying state information from off-die memory 104, and after a newer state is written to off-die memory 104 by TPM logic 110, the attacker may re-write the earlier state over the newer state so that the next time TPM 106 initializes, TPM logic 110 may read the rewritten earlier state information from off-die memory 104 and store it in a TPM state (e.g., TPM state 334 or TPM state 834, described below). In this manner, the attacker may be able to lower a count of blown fuses (e.g., TPM state fuse count 336, described below), which is included in the TPM state. Methods are provided herein for combating such replay attacks.

Figure 2:
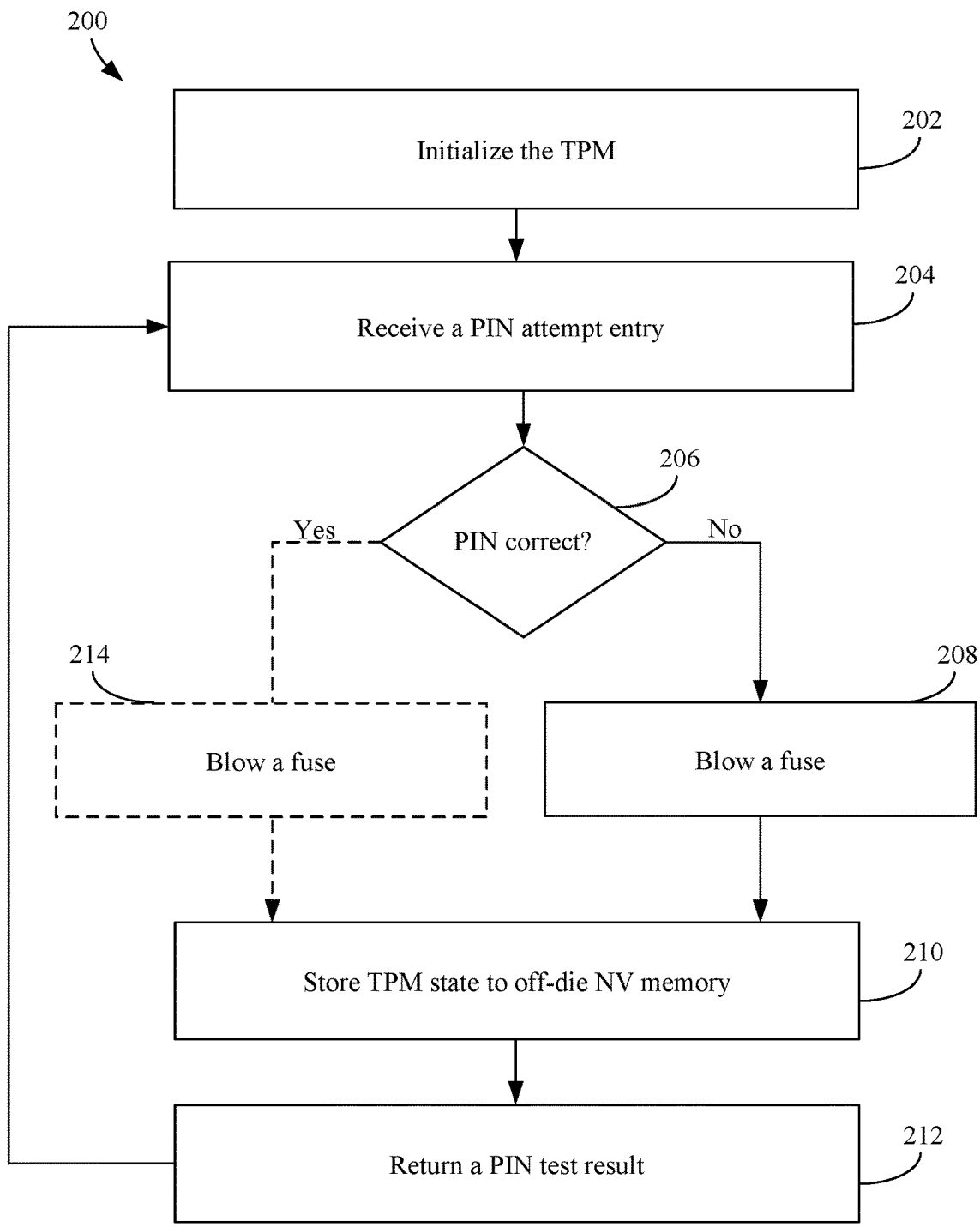
FIG. 2 is a flowchart representing multiple methods for performing fuse based replay protection, according to an example embodiment.

TPM 106 may operate in various ways to perform its functions. For instance, FIG. 2 is a flowchart 200 representing multiple methods for performing fuse based replay protection, according to an example embodiment. In an embodiment, TPM 106 may operate according to flowchart 200. Flowchart 200 is described as follows with reference to FIGS. 1 and 3.

Figure 3:
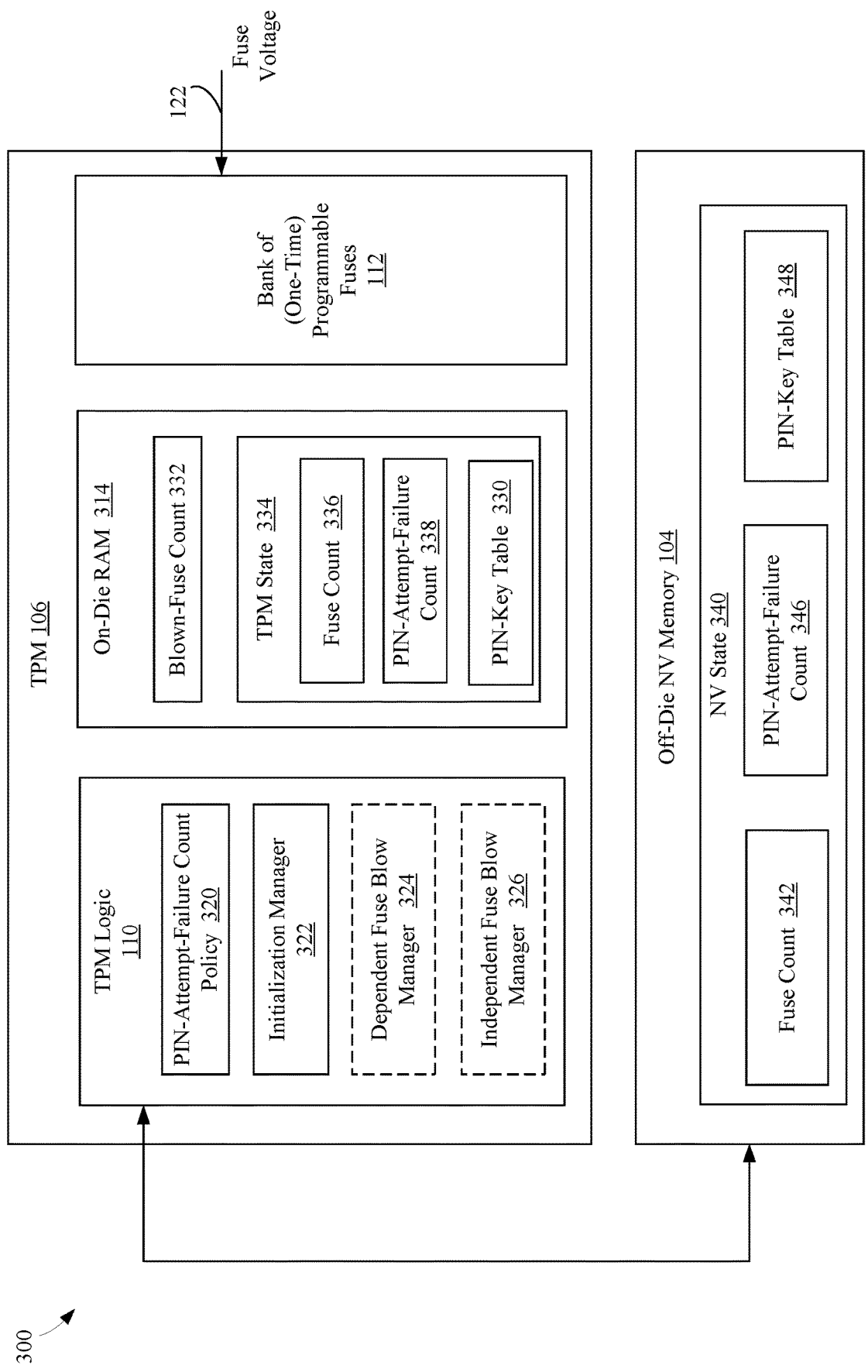
FIG. 3 is a block diagram of a system comprising a TPM with a counter comprising a plurality of fuses for verifying PIN entries and performing fused based replay protection, according to an example embodiment.

FIG. 3 is a block diagram of a system 300 comprising a TPM with a counter comprising a plurality of fuses for verifying PIN entries and performing fused based replay protection, according to an example embodiment. For example, system 300 comprises TPM 106, off-die NV memory 104, TPM logic 110, an on-die random access memory (RAM) 314, plurality of programmable fuses 112, and fuse voltage 122. TPM logic 110 comprises a PIN-attempt-failure count policy 320, an initialization manager 322, a dependent fuse blow manager 324, and an independent fuse blow manager 326. On-die RAM 314 comprises a blown-fuse count 332 and a TPM state 334. TPM state 334 comprises a TPM state fuse count 336, a TPM state PIN-attempt-failure-count 338, and a TPM state PIN-key table 330. Off-die NV memory 104 comprises a NV state 340. NV state 340 comprises a NV state fuse count 342, a NV state PIN-attempt-failure count 346, and a NV state PIN-key table 348.

On-die RAM 314 may comprise any suitable memory device such as a static RAM (SRAM) or dynamic RAM (DRAM). In some embodiments, on-die RAM 314 may be part of TPM 106. On-die RAM 314 may store variables utilized by TPM logic 110 including blown-fuse count 332 and TPM state 334 variables such as TPM state fuse count 336 and TPM state PIN-attempt-failure count 338.

Blown-fuse count 332 may comprise a current count of blown fuses in the plurality of programmable fuses 112. TPM state fuse count 336 may comprise a count for blown fuses in the plurality of programmable fuses 112 as stored in TPM state 334. TPM state fuse count 336 may have the same value as blown-fuse count 332, but it may lag behind depending on conditions of TPM 106. TPM state PIN-attempt-failure count 338 may comprise an integer value indicating the number of failed PIN attempts for a PIN. In some embodiments, TPM state PIN-attempt-failure count 338 may comprise an array of integer values, where each value in the array indicates the number of failed PIN attempts for a corresponding PIN that may be processed by TPM 106. An upper bound may be assumed for the number of PINs allowed in the TPM, and an index into the TPM state PIN-attempt-failure count 338 array may be used to specify a specific PIN. TPM state 334 may include additional variables. For example, TPM state 334 may comprise PIN-key table 330 that may be populated with authorized (e.g., correct) PINs and respective cryptographic keys that are released when a correct PIN is entered (e.g., to gain access to a system that is PIN protected by TPM 106). NV state 340 may comprise a saved copy from TPM state 334. For example, NV state fuse count 342, NV state PIN-attempt-failure count 346, and NV state PIN-key table 348 may comprise copies of TPM state fuse count 336, TPM state PIN-attempt-failure count 338, and TPM state PIN-key table 330 respectively.

In some embodiments, TPM logic 110 includes only one of dependent fuse blow manager 324 and independent fuse blow manager 326. In other embodiments, both of dependent fuse blow manager 324 and independent fuse blow manager 326 may be included in TPM logic 110. For example, TPM logic 110 may include only dependent fuse blow manager 324, only independent fuse blow manager 326, or both of dependent fuse blow manager 324 and independent fuse blow manager 326.

In some embodiments system 300 may be implemented in system 100. For purposes of illustration, system 300 is described in detail as follows with respect to flowchart 200 of FIG. 2.

Flowchart 200 begins with step 202. In step 202, the TPM may be initialized. For example, initialization manager 322 of TPM logic 110 may be configured to initialize TPM 106 by updating and/or clearing information stored in on-die RAM 314. Initialization may be performed when TPM logic 110 is newly instantiated or when TPM 106 is restarted (e.g., after SOC 102 has been powered down). The initialization process may be configured to detect when a replay attack occurred in a previous PIN attempt, and penalize the attacker by incrementing the TPM state PIN-attempt-failure count 338 (described in more detail below). Steps taken during initialization may vary depending conditions of data stored in on-die RAM 314 or the ability to read NV state 340 information into TPM state 334. For example, if a failure occurs in reading NV state 340 into TPM state 334, initialization manager 322 may be configured to treat this situation as a fresh TPM instance and reset the variables in TPM 106. For example, initialization manager 322 may be configured to determine the number of fuses blown in the plurality of programmable fuses 112 and store the determined number of blown fuses in blown-fuse count 332 of on-die RAM 314. Initialization manager 322 may also be configured to store blown-fuse count 332 to TPM state fuse count 336 and/or clear TPM state PIN-attempt-failure-count 338 (e.g., to zero), as if no PIN failures have occurred yet. Where TPM logic 110 is able to read NV state 340 information and store it as TPM state 334 information, TPM logic 110 may be configured to compare the newly written TPM state fuse count 336 to blown-fuse count 332, and if the count values do not match, this may indicate a replay attack has occurred. In response, TPM state logic may be configured to increment TPM state PIN-attempt-failure count 338 to adjust for the replay attack and penalize the attacker (e.g., when the PIN-attempt-failure count policy 320 is applied, as described in more detail below).

Steps taken during initialization may also vary depending which method of fuse based replay protection is implemented (e.g., (1) fuse based replay protection with conservative fuse usage (i.e., the first embodiment), (2) fuse based replay protection with aggressive fuse usage and fuse voltage cut countermeasures (i.e., the second embodiment), or (3) fuse based replay protection with dynamic fuse usage and fuse voltage cut countermeasures (i.e., the third embodiment)), which will be described in more detail below.

In step 204, a PIN attempt entry may be received. For example, a user may enter a PIN to gain access to a system that is PIN protected by TPM 106 (e.g., CPU 108, a computer device, a phone, an application, etc.), and the PIN may be received by TPM logic 110 for verification that the received PIN is correct. For example, TPM logic 110 may be configured to compare the received PIN to PINs registered in TPM state PIN-key table 330 to determine that the received PIN is an authorized PIN for gaining access to the system. In some embodiments, TPM 106 may be configured to verify multiple PINs (e.g., PINs 1-X). In this regard, TPM state PIN-attempt-failure count 338 may comprise a plurality of counts in an array (e.g., PIN-attempt-failure count [X]) where each count of the array corresponds to one of the PINs in TPM state PIN-key table 330).

In step 206, the received PIN may be tested as to whether it is a correct PIN. For example, TPM logic 110 may be configured to compare the received PIN value to one or more correct PINs (e.g., authorized PINs) in TPM state PIN-key table 330. Depending on which embodiment is in play, the PIN authorization process may vary. In the first embodiment, if the PIN is incorrect (e.g., not authorized) TPM logic 110 may proceed to step 208 and blow a fuse to increase the count of failed PIN attempts, whereas if the PIN is correct, TPM logic 110 may proceed to step 210 without blowing a fuse, thereby conserving fuses of the plurality of programmable fuses 112. In the second embodiment, from step 206, TPM logic 110 may be configured to proceed to step 208 to blow a fuse when the received PIN is incorrect and may proceed to step 214 and blow a fuse even when the received PIN is correct (e.g., TPM logic may be configured to blow a fuse whether or not the entered PIN is determined to be correct). In this manner, TPM logic 110 may aggressively pursue attackers that cut or reduce fuse voltage 122 before the voltage reaches a magnitude great enough to blow the fuse, and thereby avoid incrementing PIN-attempt-failure counts. In the third embodiment, TPM logic 110 may be configured to dynamically determine whether to proceed to step 208 and blow a fuse only when a PIN has been determined to be incorrect, or proceed via both of steps 208 and 214 and blow a fuse whether or not the received PIN was determined to be correct. In this manner, under some conditions (e.g., when the received PIN was verified as correct PIN in a prior PIN entry attempt), TPM logic 110 may more conservatively utilize plurality of programmable fuses 112, and in other conditions (e.g., in instances where the received PIN was not previously verified as being correct), TPM logic 110 may be configured to use the more aggressive approach as a countermeasure to a fuse voltage cut attack (as described in more detail below).

In step 210, TPM state values may be stored to off-die NV memory. For example, TPM logic 110 may be configured to write TPM state 334 (e.g., including TPM state fuse count 336, TPM state PIN-attempt-failure count 338, and TPM state PIN-key table 330) to off-die NV memory 104 as NV state 340 (e.g., as NV state fuse count 342, NV state PIN-attempt-failure count 346, and NV state PIN-key table 348).

In step 212, a PIN result may be returned. For example, TPM logic 110 may be configured to return a result that indicates whether the user has permission to access the system protected by TPM 106.

A. Fuse Based Replay Protection with Conservative Fuse Usage

As described above, TPM logic 110 of FIG. 3 may include dependent fuse blow manager 324 in embodiments providing fuse based reply protection with conservative fuse usage.

Figure 4:
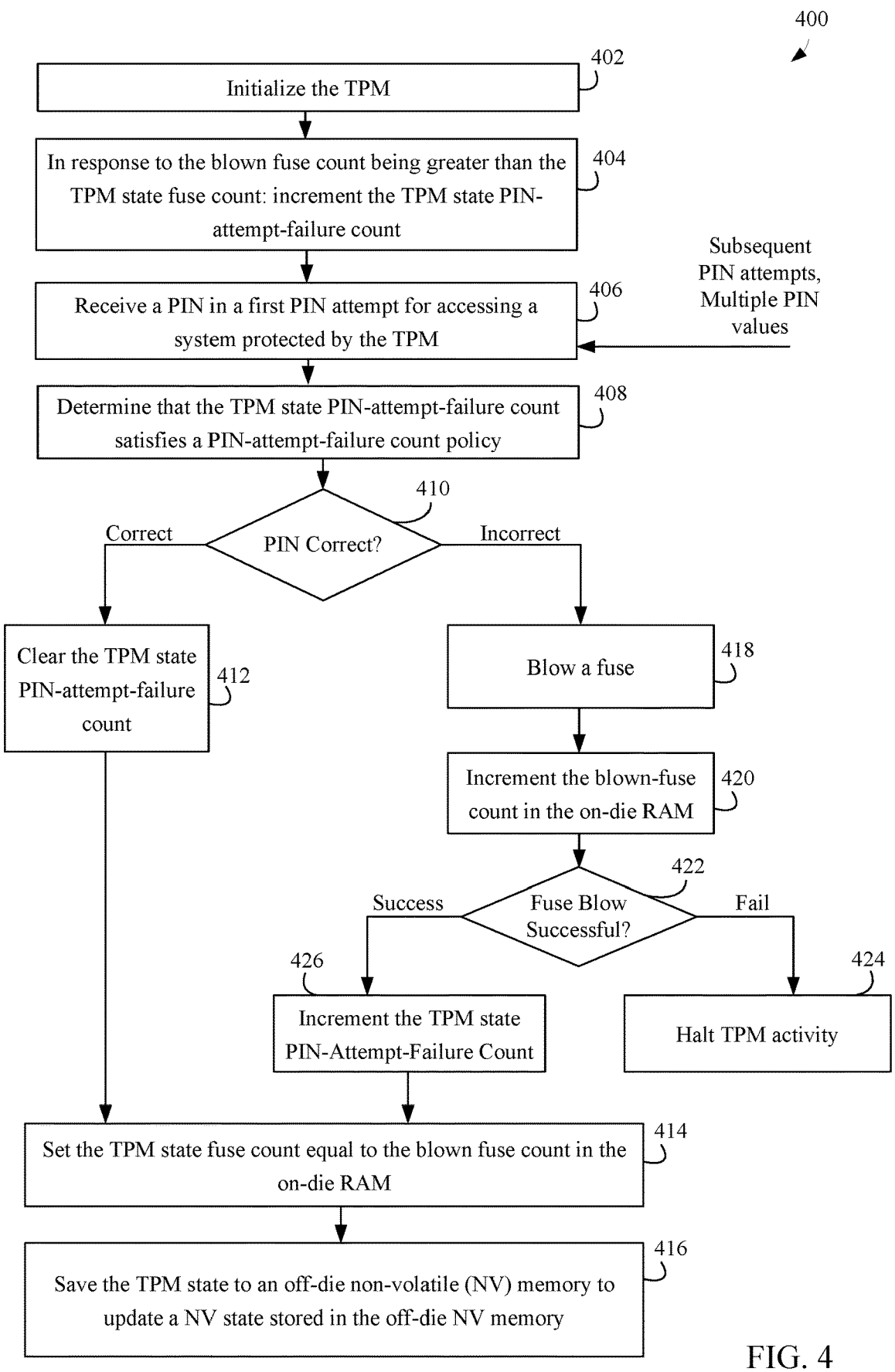
FIG. 4 is a flowchart of a method for implementing fuse based replay protection with conservative fuse usage, according to an example embodiment.

TPM 106 may operate in various ways to perform its functions. For instance, FIG. 4 is a flowchart 400 of a method for implementing fuse based replay protection with conservative fuse usage, according to an example embodiment. In an embodiment, TPM logic 110 may operate according to flowchart 400. Flowchart 400 is described as follows with reference to FIGS. 1 and 3.

Flowchart 400 begins with step 402. In step 402, the TPM may be initialized. As described above, initialization manager 322 of TPM logic 110 may be configured to initialize TPM 106 when TPM logic 110 is newly instantiated or when TPM 106 is restarted (e.g., after SOC 102 has been powered on). During initialization, initialization manager 322 may be configured to update and/or clear information stored in on-die RAM 314.

In step 404, in response to the blown-fuse count being greater than the TPM state fuse count, the TPM state PIN-attempt-failure count may be incremented. For example, as part of the initialization process, initialization manager 322 may be configured to increment TPM state PIN-attempt-failure count 338 in response to determining that the value of blown-fuse count 332 is greater than the value of TPM state fuse count 336. In one example, TPM state PIN-attempt-failure count 338 may be incremented based on the difference between blown-fuse count 332 and TPM state fuse count 336. By detecting the difference and incrementing TPM state PIN-attempt-failure count 338, a state replay attack may be discovered and a penalty imposed. For example, if an attacker rewrites an out of date NV state 340 into off-die NV memory 104 (e.g., thereby lowering NV state fuse count 342 and/or NV state PIN-attempt-failure count 346), and TPM logic 110 reads the rewritten NV state 340 into TPM state 334, at this point, TPM state fuse count 336 may be lower than blown-fuse count 332. The attacker may do this state rewriting procedure in an attempt to lower the TPM state PIN-attempt-failure count 338, and thus be able to attempt more PIN entries than allowed for by PIN-attempt-failure count policy 320. The penalty for lowering TPM state fuse count 342 relative to TPM state blown-fuse count 332 may be imposed by incrementing TPM state PIN-attempt-failure count 338, which may affect whether a PIN entry attempt is allowed to be considered for access according to PIN-attempt-failure count policy 320. Additional steps of initialization are described with respect to FIGS. 5 and 6.

Whereas steps 402 and 404 may be part of the initialization process, steps 406 through 416 may be part of a PIN verification process, which may be repeated for each PIN entry.

In step 406, a PIN may be received in a first PIN attempt for accessing a system protected by the TPM. For example, a user may enter a PIN for verification by TPM logic 110, in order to access a system that is PIN protected by TPM 106 (e.g., CPU 108, a computer device, a phone, an application, etc.). As described above, TPM logic 110 may be configured to authenticate multiple PINs and may receive different valid PIN values in different PIN entry attempts.

In step 408, it may be determined whether the TPM state PIN-attempt-failure count satisfies a PIN-attempt-failure count policy. For example, TPM logic 110 may be configured to determine that TPM state PIN-attempt-failure count 338 satisfies PIN-attempt-failure count policy 320. If the policy is satisfied, TPM logic 110 may be configured to continue the PIN verification process for the received PIN. However, if the policy is not satisfied, a penalty may be enforced. For example, TPM logic 110 may be configured to compare a current value stored in TPM state PIN-attempt-failure count 338 to a PIN attempt threshold configured with respect to PIN-attempt-failure count policy 320. In instances where TPM state PIN-attempt-failure count 338 has a specified relationship to the PIN attempt threshold (e.g., TPM state PIN-attempt-failure count 338 exceeds the PIN attempt threshold) TPM logic 110 may be configured to deny access to the system protected by TPM 106, and enforce a rule regarding whether another PIN entry attempt will be processed. For example, PIN-attempt-failure count policy 320 may indicate that if a specified number of PIN entry attempts have failed, no more PIN attempts will be accepted, or a user must wait a specified amount of time to try another PIN attempt.

In step 410, in instances when the received PIN is correct, TPM logic 110 may proceed to step 412.

In step 412, the TPM state PIN-attempt-failure count may be cleared. For example, if the received PIN is correct, TPM logic 110 may be configured to clear TPM state PIN-attempt-failure count 338 (e.g., to zero) for the received PIN value. This may affect the result when the PIN-attempt-failure count policy is applied to the next received PIN. As noted above, in some embodiments, TPM state PIN-attempt-failure count 338 may comprise a plurality of counts in an array (e.g., PIN-attempt-failure count [X]) where each count in the array corresponds to a different PIN of a plurality of PINs that may be verified by TPM logic 110. Subsequent to step 412, TPM logic 110 may proceed to step 414.

In step 410, in instances when the received PIN is incorrect, TPM logic 110 may proceed to step 418.

In step 418, a fuse may be blown. For example, dependent fuse blow manager 324 of TPM logic 110 may be configured to blow a fuse of the plurality of programmable fuses 112 in response to the PIN being deemed incorrect. In some embodiments, dependent fuse blow manager 324 may control fuse voltage 122 to blow the fuse. However, the disclosure is not limited with regard to how a counter comprising the programmable fuses 112 is incremented.

In step 420, the blown-fuse count in the on-die RAM may be incremented. For example, in response to blowing the fuse in programmable fuses 112, dependent fuse blow manager 324 may be configured to increment blown-fuse count 332 stored in on-die RAM 314.

In step 422, in instances where the fuse blow was unsuccessful, TPM logic 110 may proceed to step 424.

In step 424, activity of TPM 106 may be halted. For example, TPM logic 110 may be configured to halt TPM 106 activity and may place TPM 106 in a failure state, in response to a fuse failing to blow after dependent fuse blow manage 324 attempted to blow it. In some embodiments, TPM logic 110 may shut down PIN verification in response to the fuse blow failure. In this regard, the failure of the fuse to blow may indicate that a fuse voltage cut attack occurred after dependent fuse blow manager 324 (or TPM logic in general) made an attempt to blow it. For example, an attacker may monitor power provided to TPM 106 (e.g., fuse voltage 122) to detect when the power increases to a level that indicates a fuse blow is underway. The attacker may then cut or diminish fuse voltage 122, thereby denying voltage needed to blow the fuse. The attacker's goal may be to prevent TPM logic 110 from recording occurrences of failed PIN tries or incorrect PIN entries. The attacker's motive may be to gain additional PIN tries (e.g., unlimited PIN tries) in order to discover (e.g., steal) one or more authorized PINs. To counter such attacks, TPM logic 110 has the ability to blow fuses and execute code. However, although the attacker may not have access to the internal components of TPM 106 or SOC 102, they may be able to gain access to external components such as off-die NV memory, fuse voltage 122, SOC voltage 120, or always-on power rail 830 (described with respect to FIG. 8) in order to breach the PIN protection methods of the TPM 106.

In step 422, in instances when the fuse blow was successful, TPM logic 110 may proceed to step 426.

In step 426, the TPM state PIN-attempt-failure count may be incremented. For example, dependent fuse blow manager 324 may be configured to increment TPM state PIN-attempt-failure count 338 in response to blown-fuse count 332 being incremented. Subsequent to step 426, TPM logic 110 may proceed to step 414.

In step 414, the TPM state fuse count may be set equal to the blown fuse count in the on-die RAM. For example, TPM logic 110 may be configured to write the value of blown-fuse count 332 into TPM state fuse count 336.

In step 416, the TPM state may be saved to an off-die non-volatile (NV) memory to update a NV state stored in the off-die NV memory. For example, TPM logic 110 may be configured to store TPM state 334, comprising the values of TPM state PIN-attempt-failure count 338, TPM state fuse count 336, and TPM state PIN-key table 330, to NV state 340 in off-die NV memory 104, as NV state PIN-attempt-fail count 346, NV state fuse count 342, and NV state PIN-key table 348, respectively.

Figure 5:
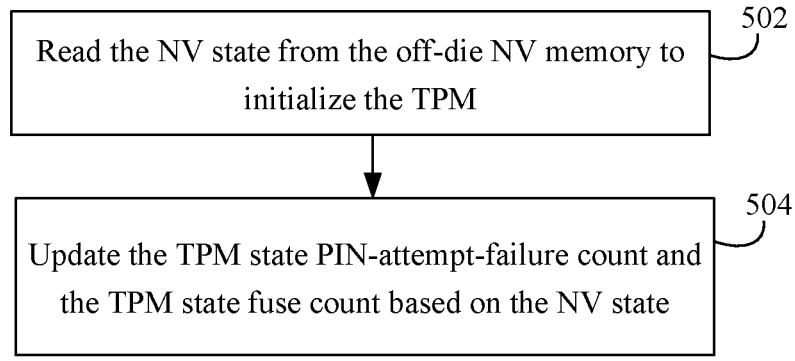
FIG. 5 is a flowchart of a method for initializing the TPM, according to an example embodiment.

Initialization manager 322 may operate in various ways to perform its functions. For instance, FIG. 5 is a flowchart 500 of a method for initializing the TPM, according to an example embodiment. Flowchart 500 may be performed as part of flowchart 400 (FIG. 4), such as prior to step 406. In an embodiment, initialization manager 322 may operate according to flowchart 500. Flowchart 500 is described as follows with reference to FIGS. 1 and 3.

Flowchart 500 includes step 502. In step 502, the NV state may be read from the off-die NV memory to initialize the TPM. For Example, initialization manager 322 may be configured to retrieve NV state fuse count 342, NV state PIN-attempt-failure count 346, and NV state PIN-key table 348 of NV state 340 from off-die memory 104 for an initialization process.

In step 504, the TPM state PIN-attempt-failure count and the TPM state fuse count may be updated based on the NV state. For example, initialization manager 322 may be configured to write values of NV state fuse count 342, NV state PIN-attempt-failure count 346, and NV state PIN-key table 348 to TPM state fuse count 336, TPM state PIN-attempt-failure count 338, and TPM state PIN-key table 330, respectively. As described above with respect to FIG. 4, steps 402 and 404 of flowchart 400 may also be performed as part of the initialization process.

Figure 6:
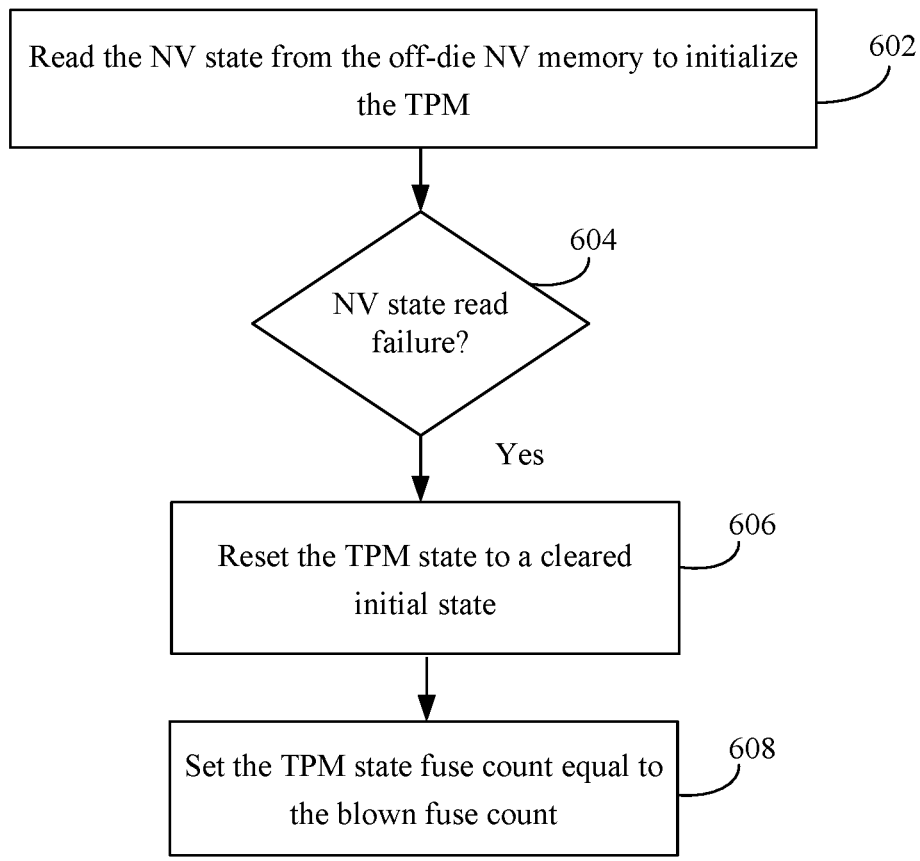
FIG. 6 is a flowchart of a method for initializing the TPM in instances where the TPM is unable to read the state variables from external non-volatile memory, according to an example embodiment.

Initialization manager 322 may operate in various ways to perform its functions. For instance, FIG. 6 is a flowchart 600 of a method for initializing the TPM in instances where the TPM is unable to read the state variables from external non-volatile memory, according to an example embodiment. Flowchart 600 may be performed as part of flowchart 400 (FIG. 4), such as prior to step 406. In an embodiment, initialization manager 322 may operate according to flowchart 600. Flowchart 600 is described as follows with reference to FIGS. 1 and 3.

Flowchart 600 may be performed as part of flowchart 400 (FIG. 4), such as during or after step 410. In an embodiment, pull mode manager 106 and/or transmission manager 318 may operate according to flowchart 600. Flowchart 600 is described as follows with reference to FIGS. 1 and 3.

Flowchart 600 includes step 602. In step 602, the NV state may be read from the off-die NV memory to initialize the TPM. For example, initialization manager 322 may be configured to retrieve NV state fuse count 342, NV state PIN-attempt-failure count 346, and NV state PIN-key table 348 of NV state 340 from off-die memory 104 for an initialization process.

In step 604, in response to a failure in reading NV state from off-die NV memory, TPM logic 110 may proceed to step 606.

In step 606, the TPM state may be reset to a cleared initial state. For example, initialization manager 322 may be configured to clear TPM state 334 where the values held in TPM state fuse count 336, TPM state PIN-attempt-failure count 338, and TPM state PIN-key table 330 are cleared to zero or to a nulled state.

In step 608, the TPM state fuse count may be set equal to the blown fuse count. For example, initialization manager 322 may be configured to set the value of TPM state fuse count 336 to the value of blown-fuse count 332.

As described above with respect to FIG. 4, steps 402 and 404 of flowchart 400 may also be performed as part of the initialization process.

B. Fuse Based Replay Protection with Aggressive Fuse Usage and Countermeasures for Fuse Voltage Cut Attacks As described above, TPM logic 110 of FIG. 3 may include independent fuse blow manager 326 in embodiments providing fuse based reply protection with aggressive fuse usage and countermeasures for fuse voltage cut attacks.

Figure 7:
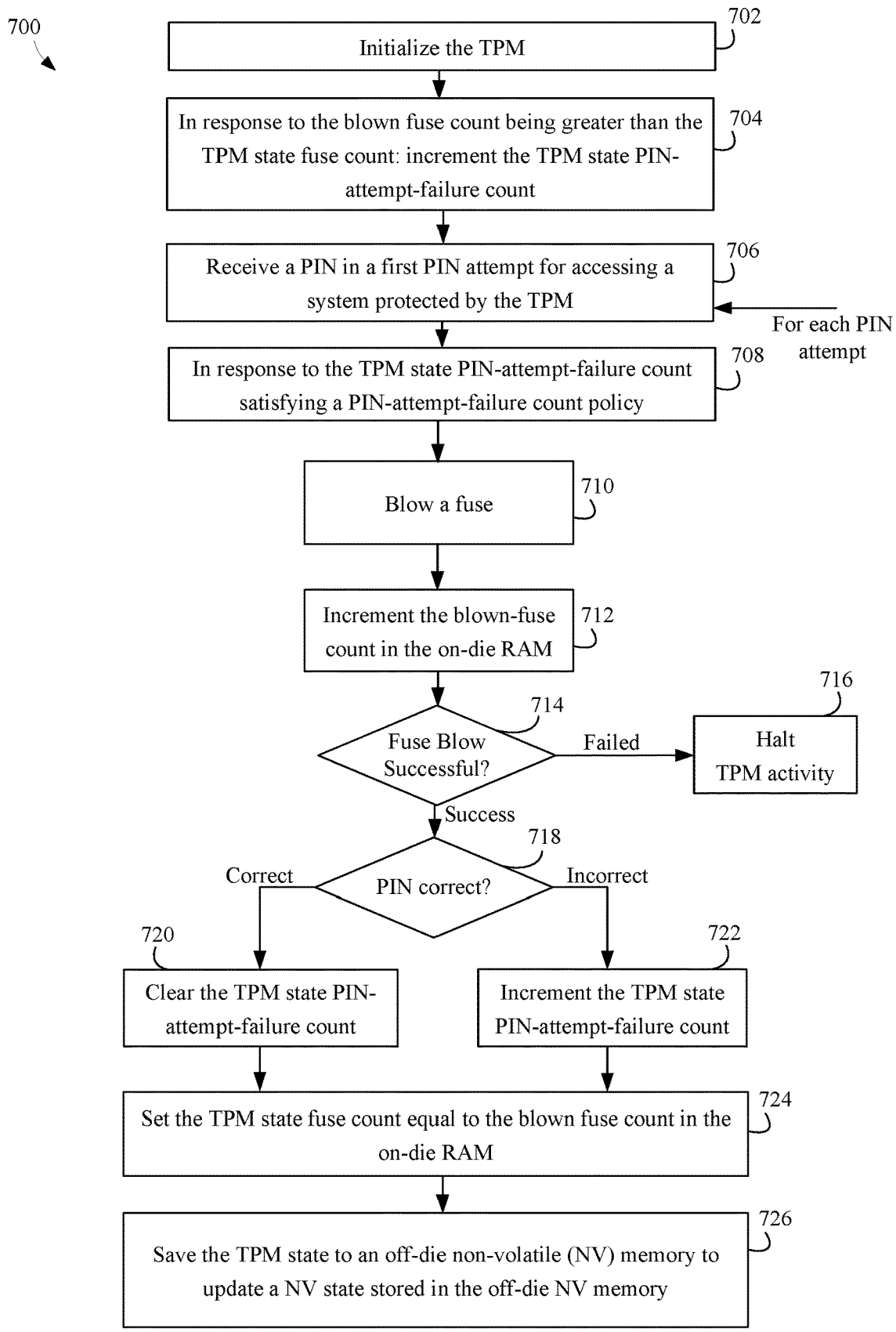
FIG. 7 is a flowchart of a method for implementing fuse based replay protection with aggressive fuse usage, according to an example embodiment.

TPM 106 may operate in various ways to perform its functions. For instance, FIG. 7 is a flowchart 700 of a method for implementing fuse based replay protection with aggressive fuse usage, according to an example embodiment. In an embodiment, TPM logic 110 may operate according to flowchart 700. The initialization process described above with respect to the fuse based replay protection with conservative fuse usage embodiment (e.g., in steps 402 and 404 of flowchart 400, and in flow charts 500 and 600) may be similar or substantially the same as the initialization process for this method of implementing fuse based replay protection with aggressive fuse usage. Flowchart 700 is described as follows with reference to FIGS. 1 and 3.

Flowchart 700 begins with step 702. In step 702, the TPM may be initialized. For example, as described above, initialization manager 322 of TPM logic 110 may be configured to initialize TPM 106 when TPM logic 110 is newly instantiated or when TPM 106 is restarted (e.g., after SOC 102 has been powered on). During initialization, initialization manager 322 may be configured to update and/or clear information stored in on-die RAM 314.

In step 704, in response to the blown-fuse count being greater than the TPM state fuse count, the TPM state PIN-attempt-failure count may be incremented. For example, as part of the initialization process, initialization manager 322 may be configured to increment TPM state PIN-attempt-failure count 338 in response to determining that the value of blown-fuse count 332 is greater than the value of TPM state fuse count 336. In one example, TPM state PIN-attempt-failure count 338 may be incremented based on the value of a difference between blown-fuse count 332 and TPM state fuse count 336. As described in more detail above, with respect to step 404 of flowchart 400, by detecting the difference and incrementing TPM state PIN-attempt-failure count 338, a state replay attack may be discovered and a penalty imposed. Additional steps of initialization are described with respect to FIGS. 5 and 6

Whereas steps 702 and 704 may be part of the initialization process, steps 706 through 726 may be part of a PIN verification process, which may be repeated for each PIN entry.

In step 706, a PIN is received in a first PIN attempt for accessing a system protected by the TPM. For example, a user may enter a PIN for verification by TPM logic 110 in order to access a system that is PIN protected by TPM 106. As described above, TPM logic 110 may be configured to process multiple PINs and may receive different valid PIN values in different PIN entry attempts.

In step 708, it may be determined whether the TPM state PIN-attempt-failure count satisfies a PIN-attempt-failure count policy. For example, as described in more detail above, with respect to step 408 of flowchart 400, TPM logic 110 may determine whether TPM state PIN-attempt-failure count 338 satisfies PIN-attempt-failure count policy 320. If the policy is satisfied, the TPM logic 110 may continue the PIN verification process for the received PIN. However, if the policy is not satisfied a penalty may be enforced.

In step 710, a fuse is blown. For example, independent fuse blow manager 326 may blow a fuse of plurality of programmable fuses 112 for each received PIN, regardless of whether the received PIN is verified to be correct or deemed incorrect. In this manner, the fuses may be utilized in a less efficient way than in the first embodiment for Fused Based Replay Protection with Conservative Fuse Usage (as described above with respect to FIGS. 4-6). However, blowing a fuse for each PIN attempt may prevent fuse voltage cut attacks where an attacker determines whether they have entered a correct PIN versus an incorrect PIN based on whether extra voltage is drawn for blowing a fuse, and may cut the voltage before the fuse is blown. For example, if a fuse is blown only when a PIN is incorrect, as described above with respect to steps 410-424 of flowchart 4, an attacker may monitor the input voltage that feeds the plurality of programmable fuses 112, and when the voltage begins to increase the user may reason that the entered PIN was incorrect (PIN entries that do not elicit an increase voltage level may be considered to be correct by the attacker). Also, the attacker may cut or diminish fuse voltage 122 before the input voltage reaches a high enough level to blow the fuse, thereby stopping the fuse blow even when the received PIN was incorrect. When the extra voltage is drawn, the attacker may restart the system before the fuse is blown, and begin the PIN entry process all over again. However, since blown-fuse count 332 may not have been incremented due to the fuse voltage cut attack, step 404 of flowchart 400 may not increment TPM state PIN-attempt-failure count 338, and the cut voltage attack may go undetected. Thus, the attacker may continue this fuse voltage cut process repeatedly until one or more correct PINs are discovered. By blowing a fuse for each received PIN in the aggressive fuse blow embodiment, the attacker is denied the knowledge of whether an entered PIN was correct or incorrect, and the fuse voltage cut attacks are rendered useless.

In step 712, the blown-fuse count stored in the on-die RAM is incremented. For example, independent fuse blow manager 326 may be configured to increment the value stored in blown-fuse count 332 in response to blowing a fuse of the plurality of programmable fuses 112.

In step 714, in instances where the fuse blow was unsuccessful, independent fuse blow manager 326 may proceed to step 716.

In step 716, TPM activity may be halted. For example, independent fuse blow manager 326 may be configured to halt TPM 106 activity and place TPM 106 in a failure state, in response to a fuse failing to blow after independent fuse blow manager 326 attempted to blow it. In some embodiments, independent fuse blow manager 326 may be configured to shut down PIN verification in response to the fuse blow failure. As described above, an unsuccessful fuse blow may indicate occurrence of a fuse voltage cut attack.

In step 714, in instances where the fuse blow was successful, independent fuse blow manager 326 may proceed to step 718.

In step 718, in instances where the received PIN was correct, independent fuse blow manager 326 may proceed to step 720.

In step 720, independent fuse blow manager 326 may be configured to clear TPM state PIN-attempt-failure count 338. For example, TPM state PIN-attempt-failure count 338 may be set to zero.

In step 718, in instances where the received PIN was incorrect, independent fuse blow manager 326 may proceed to step 722.

In step 722, independent fuse blow manager 326 may be configured to increment TPM state PIN-attempt-failure count 338. In some embodiments, independent fuse blow manager 326 may be configured to determine the difference between the blown-fuse count 332 and TPM state fuse count 336, and increment TPM state PIN-attempt-failure count 338 based on the difference.

From steps 720 and 722, independent fuse blow manager 326 may proceed to step 724.

In step 724, TPM state fuse count may be set equal to the blown-fuse count in the on-die RAM. For example, independent fuse blow manager 326 may be configured to write the value of blown-fuse count 332 to TPM state fuse count 336.

In step 726, the TPM state may be saved to an off-die NV memory to update a NV state stored in the off-die NV memory. For example, independent fuse blow manager 326 may be configured to save one or more values of TPM state 334 to NV state 340 of off-die NV memory 104. In this regard, TPM state fuse count 336, TPM state PIN-attempt-failure count 338, and/or TPM state PIN-key table 330 may be saved to off-die NV memory 104 as NV state fuse count 342, NV state PIN-attempt-failure count 346, and NV state PIN-key table 348.

As described above, TPM logic 110 may be configured to handle a plurality of PINs, and TPM state PIN-attempt-failure count 338 may comprise an array comprising PIN-attempt-failure counts for the plurality of PINs.

C. Fuse Based Replay Protection with Dynamic Fuse Usage and Countermeasures for Fuse Voltage Cut Attacks In general, this embodiment of fuse based replay protection with dynamic fuse usage and countermeasures for fuse voltage cut attacks is able to keep track of whether a PIN has been successfully entered before (e.g., during a current session), and if it has been, the more conservative fuse usage method is used, which only blows a fuse when a received PIN is incorrect. However, in the case where a received PIN has not been successfully entered before, the more secure method is applied, which includes blowing a fuse for each PIN attempt. This method leverages an always-on state to conserve fuse usage while also keeping the TPM secure against replay attacks.

Figure 8:
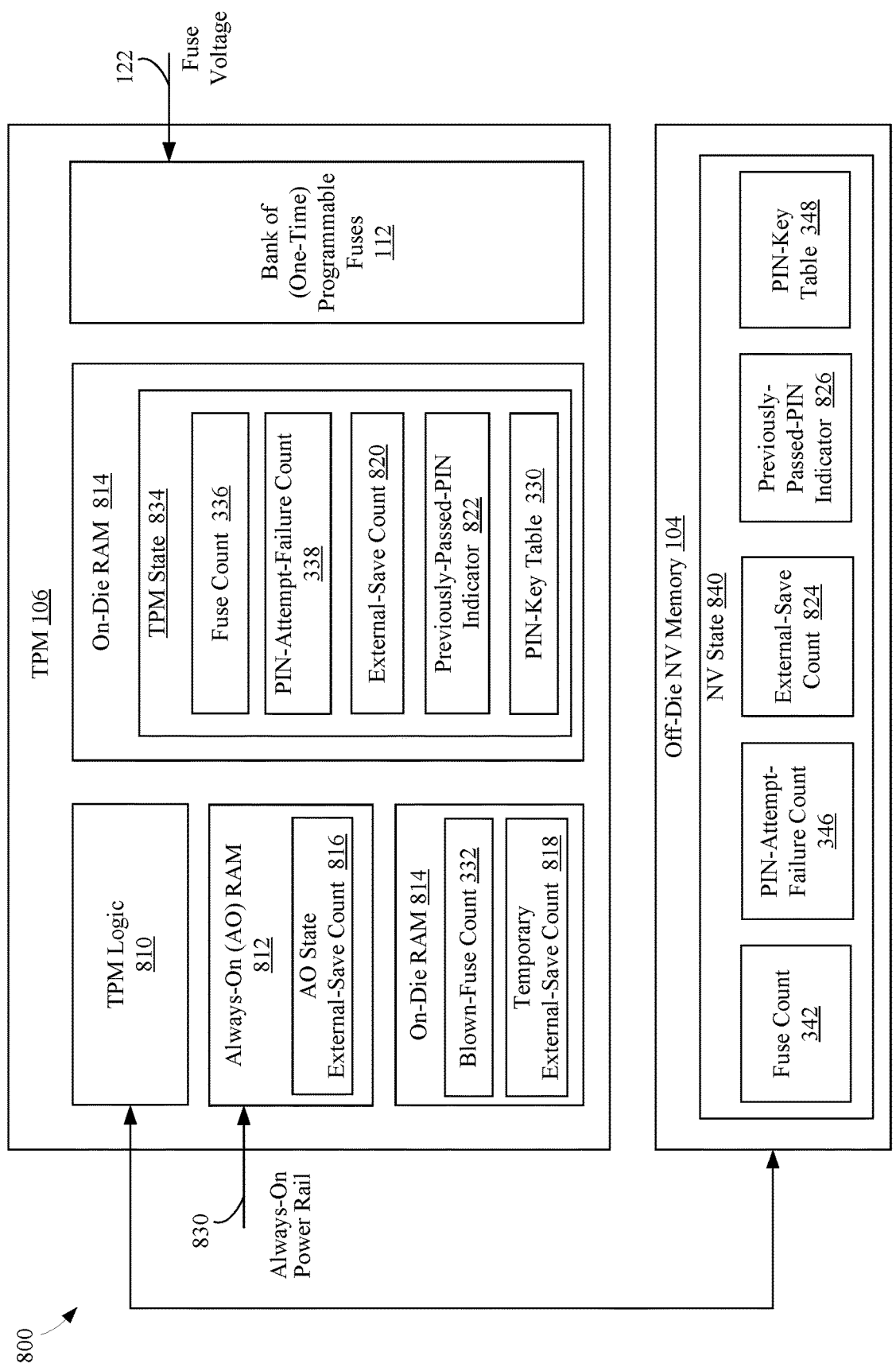
FIG. 8 is a block diagram of a system comprising a TPM implemented on a SOC for implementing fuse based replay protection with dynamic fuse usage, according to an example embodiment.

As described above, fuse based replay protection may be implemented in various ways. For instance, FIG. 8 is a block diagram of a system 800 comprising a TPM implemented on a SOC for implementing fuse based replay protection with dynamic fuse usage, according to an example embodiment. As shown in FIG. 8, system 800 comprises TPM 106, off-die NV memory 104, fuse voltage 122, and an always-on (AO) power rail 830. TPM 106 comprises plurality of programmable fuses 112, TPM logic 810, an always-on (AO) RAM 812, and an on-die RAM 814. On-die RAM 814 comprises blown-fuse count 332, TPM state 834, and temporary external-save count 818. TPM state 834 comprises TPM state fuse count 336, TPM state PIN-attempt-failure count 338, a TPM state external-save count 820, a TPM state previously-passed-PIN indicator 822, and TPM state PIN-key table 330. AO RAM 812 comprises an AO state external-save count 816. Off-die NV memory 104 comprises NV state 840. NV state 840 comprises NV state fuse count 342, NV state PIN-attempt-failure count 346, a NV state external-save count 824, a NV state previously-passed-PIN indicator 826, and a NV state PIN-key table 348. In some embodiments, TPM state PIN-attempt-failure count 338, NV state PIN-attempt-failure count 346, TPM state previously-passed-PIN indicator 822, and NV state previously-passed-PIN indicator 826 may each comprise an array of counts or indicators, each count or indicator corresponding to a particular PIN handled by TPM logic 810.

Figure 9:
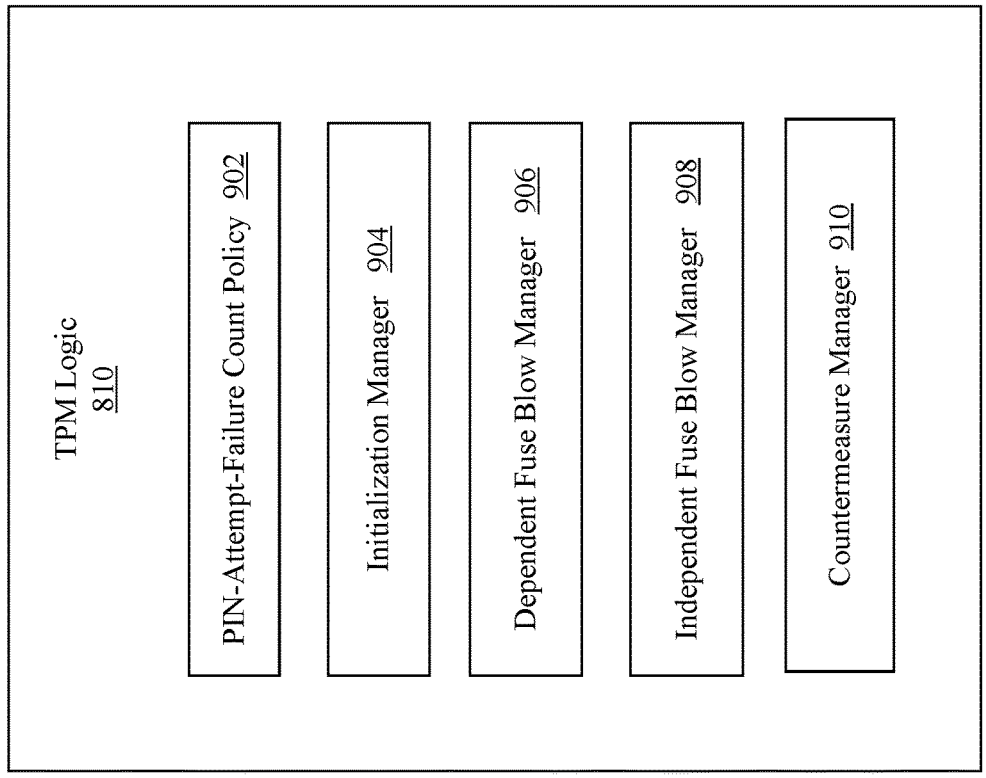
FIG. 9 is a block diagram of a system comprising the TPM logic of FIG. 8, according to an example embodiment.

Moreover, FIG. 9 is a block diagram of a system 900 comprising the TPM logic of FIG. 8, according to an example embodiment. As shown in FIG. 9 system 900 comprises TPM logic 810. TPM logic 810 comprises PIN-attempt-failure count policy 902, initialization manager 904, dependent fuse blow manager 906, independent fuse blow manager 908, and countermeasure manager 910.

As shown in system 100, SOC 102 may comprise TPM 106 and CPU 108, and may be communicatively coupled to off-die NV memory 104. In systems 800 and 900, TPM 106 and off-die NV memory 104 may be configured to implement the third embodiment described herein that provides dynamic fuse usage and countermeasures for fuse voltage cut attacks. Systems 800 and 900 are described in more detail as follows.

AO RAM 812 may store AO state external-save count 816. AO state external-save count 816 may be utilized to record a counter (e.g., an always-on monotonic counter) for detecting state replay attacks. AO state external-save count 816 may be cleared (e.g., revert to zero) when power is lost to AO RAM 812.

AO RAM 812 may comprise a portion of on-die RAM of TPM 106, which receives power from always-on power rail 830 that may provide voltage or stand-by voltage. AO RAM 812 may comprise any suitable AO memory such as AO static RAM (SRAM) or AO dynamic RAM (DRAM). In some embodiments, AO power rail 830 may be configured to provide stand-by voltage to AO RAM 812 even while SOC 102 and/or a device hosting SOC 102 (e.g., a phone, computer, etc.) are "switched off" (according to an electronic interface), but may be plugged into an AC power source or may have batteries (e.g., coin battery, laptop battery, etc.) connected to AO power rail 830. Thus, AO RAM 812 may retain its state even when the hosting system and/or SOC 102 are in a sleep or standby mode, and may retain state when most of the system is off. Loss of power to AO power rail 830 may be a rare event but the longer power can be preserved, the fewer fuses needed to be blown to perform the embodiment described herein.

AO RAM 812 may be accessible only by TPM logic 810. TPM logic 810 may be configured such that any data written to this area of RAM cannot be maliciously modified by an attacker, nor can it be replayed. However, the attacker may be able to withdraw power to the always-on power rail 830, and thus cause always-on RAM 812 to lose its state. When this happens, AO state external-save count 816 may be cleared (e.g., revert to zero).

AO state external-save count 816 may comprise a variable (e.g., a four byte value) stored in on-die AO RAM 812 and may be utilized as a counter (e.g., a monotonic counter). AO state external-save count 816 may be incremented each time TPM state 834 values are saved to NV state 840 in off-die NV memory 104. By keeping this count in an always-on memory, replay attacks may be detected and penalized during TPM 106 initialization (e.g., when AO state external-save count 816 is greater than TPM state external-save count, described below in steps 1508-1510 with respect to FIG. 15). This count may also be used during TPM 106 initialization to detect and apply a penalty for a fuse voltage cut attack. For example, AO state external-save count 816 may be cleared before the PIN verification process in order to set a trap for detecting a fuse voltage cut attack during a following TPM 106 initialization process (e.g., steps 1502-1504 described below with respect to FIG. 15).

Temporary external-save count 818 may comprise a variable stored in on-die RAM 814 and used to temporarily hold AO state external-save count 816 before AO state external-save count 816 is cleared to set the trap for detecting a fuse voltage cut attack. Temporary external-save count 818 may be incremented each time TPM state 834 values are saved to NV state 840 in off-die NV memory 104 and may be saved to AO state external-save count 816.

TPM state external-save count 820 may comprise a variable of TPM state 834 stored in on-die RAM 814 and may be used as a counter (e.g., a monotonic counter). The value of TPM state external-save count 820 may be utilized to detect a replay attack during the TPM initialization process (e.g., when TPM state external-save count 820 is less than AO state external-save count 816, described below with respect to steps 1508-1510 of FIG. 15).

TPM state previously-passed-PIN indicator 822 may comprise a variable of TPM state 834 stored in on-die RAM 814, such as a Boolean flag or an array of such flags (e.g., each flag corresponding to a PIN handled by TPM logic 810). TPM state previously-passed-PIN indicator 822 may be used indicate whether a specific PIN has already been successfully used (e.g., verified to be correct) during a current always-on session (e.g., since SOC 102 or a device hosting SOC 102 has lost power or been rebooted). In instances when TPM state previously-passed-PIN indicator 822 is set to "true," TPM logic may utilize the conservative fuse blow method and when it is set to "false" the aggressive fuse blow method may be utilized for PIN verification.

NV state external-save count 824 may comprise a variable of NV state 840 stored in off-die NV memory 104, which may be available to TPM logic 810 for storing TPM 834 state information. As described above with respect to TPM logic 110, TPM logic 810 may be configured to encrypt and integrity protect TPM state 834 information, and store it to off-die NV memory 104 to prevent the disclosure or modification of the state information. Although the state information may be encrypted, an attacker may be able to replay previously signed state information in TPM 106, by copying state information from off-die memory 104, and after newer state information is written to off-die memory, the attacker may re-write the earlier state over the newer state in off-die NV memory 104, such that the next time TPM 106 initializes, TPM logic 810 may read the rewritten earlier state information from off-die memory 104 into TPM state 834. In this manner, the attacker may be able to lower a count of blown fuses indicated in the state information (e.g., TPM state fuse count 336).

NV state previously-passed-PIN indicator 826 may comprise a variable of NV state 840 stored in off-die NV memory 104, which may be available to TPM logic 810 for storing TPM state previously-passed-PIN indicator 822.

PIN-attempt-failure count policy 902 (FIG. 9) may be similar or substantially the same as PIN-attempt-failure count policy 320. In one embodiment, PIN-attempt-failure count policy 902 may comprise a PIN attempt threshold and/or a rule for determining whether PIN authentication is allowed to proceed for a received PIN entry based on how many PIN entry attempts have already been tried. For example, TPM logic 810 may determine whether TPM state PIN-attempt-failure count 338 for a particular received PIN satisfies PIN-attempt-failure count policy 902. The penalty for entering too many incorrect PINs may vary depending on the rule. For example, TPM logic 810 may deny access to the system protected by TPM 106, and enforce a rule indicating no more PIN attempts will be accepted or processed, or a user must wait a specified amount of time to try another PIN attempt.

Figure 10:
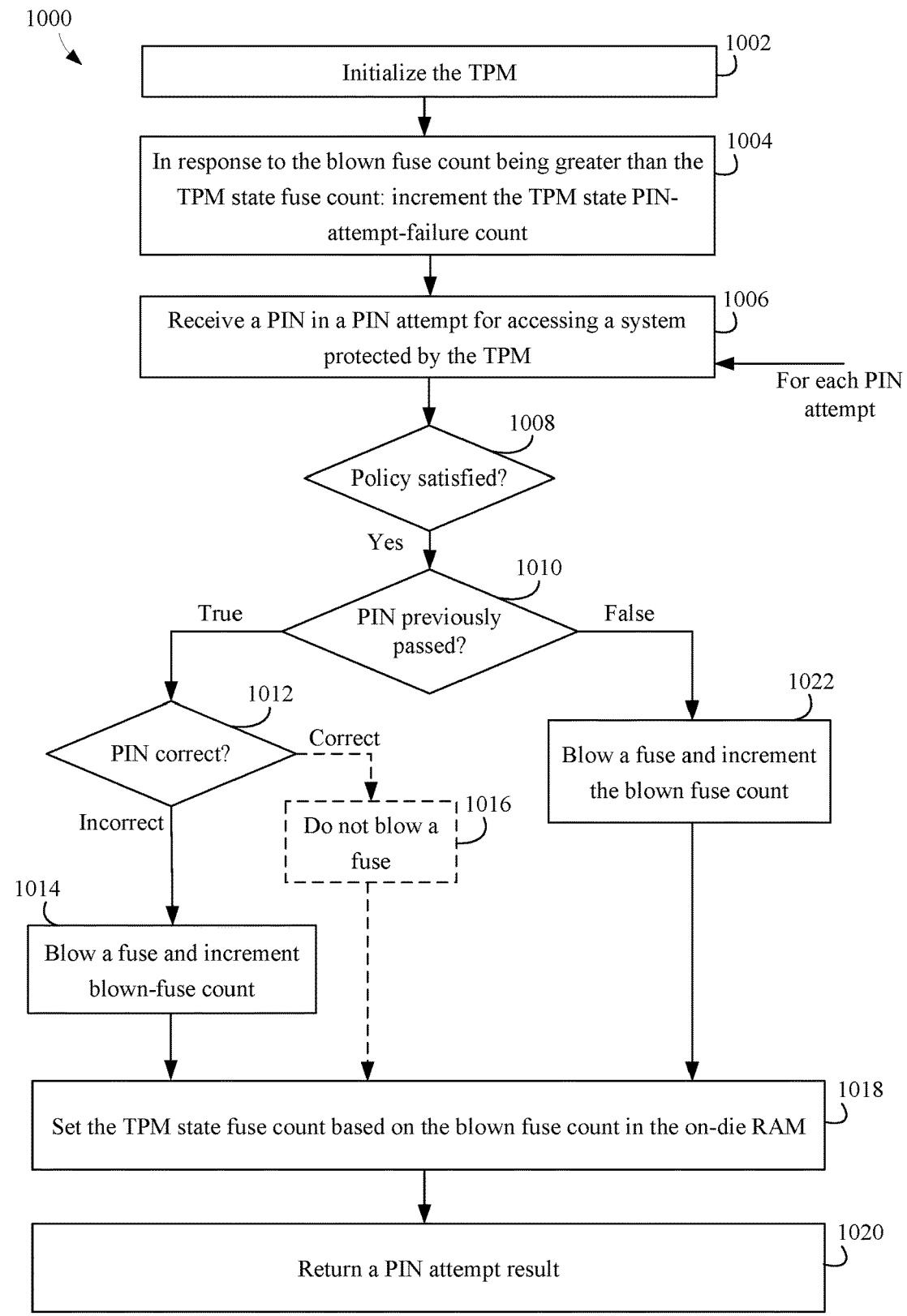
FIG. 10 is a flowchart of a method for implementing fuse based replay protection with dynamic fuse usage, according to an example embodiment.

TPM logic 810 may operate in various ways to perform its functions. For instance, FIG. 10 is a flowchart 1000 of a method for implementing fuse based replay protection with dynamic fuse usage, according to an example embodiment. In an embodiment, TPM logic 810 may operate according to flowchart 1000. Flowchart 1000 is described as follows with reference to FIGS. 8 and 9.

Flowchart 1000 begins with step 1002. In step 1002, the TPM may be initialized. For example, as described above, initialization manager 904 of TPM logic 810 may be configured to initialize TPM 106 when TPM logic 810 is newly instantiated or when TPM 106 is restarted (e.g., after SOC 102 has been powered on). During initialization, initialization manager 904 may be configured to update and/or clear information stored in on-die RAM 314.

In step 1004, in response to the blown-fuse count being greater than the TPM state fuse count, the TPM state PIN-attempt-failure count may be incremented. For example, as described above with respect to step 404 of flowchart 400, as part of the initialization process, countermeasure manager 910 may be configured to increment TPM state PIN-attempt-failure count 338 in response to determining that the value of blown-fuse count 332 is greater than the value of TPM state fuse count 336. For example, TPM state PIN-attempt-failure count 338 may be incremented based on the difference between blown-fuse count 332 and TPM state fuse count 336. If blown-fuse count 332 is greater than TPM state fuse count 336, this may indicate that a state replay attack has occurred. Countermeasure manager 910 may be configured to impose a penalty for the attack by incrementing TPM state PIN-attempt-failure count 338 so that the impact of the attack may be rendered useless the next time the PIN-attempt-failure count policy 902 is applied. This portion of the initialization process may be similar or substantially the same as described in the previous two embodiments (e.g., the conservative fuse usage method and aggressive fuse usage method).

Whereas steps 1002 and 1004 of FIG. 10 may be part of the initialization process, steps 1006 through 1020 may be part of a PIN verification process, which may be repeated for each PIN entry. Additional steps of the initialization process are described with respect to flowchart 1500 (FIG. 15) and flowcharts 500 and 600 (FIGS. 5 and 6) as performed by initialization manager 904, described below).

In step 1006, a PIN may be received in a PIN attempt for accessing a system protected by the TPM. For example, a user may enter a PIN in order to access a system that is PIN protected by TPM 106 (e.g., CPU 108, a computer device, a phone, an application, etc.). As described above, TPM logic 810 may be configured to authenticate multiple PINs and may handle different PIN values in different PIN entry attempts.

In step 1008, in instances where the received PIN satisfies PIN-attempt-failure count policy 902, TPM logic 810 may proceed to step 1010.

In step 1010, in instances where the value of the received PIN was previously received and verified to be correct during the current session (e.g., since SOC 102 or a device hosting SOC 102 has lost power or been rebooted), TPM logic 810 may be configured to proceed to step 1012. For example, TPM logic 810 may proceed to step 1012 if it determines that TPM state previously-passed-PIN indicator 822 is set to true.

In step 1012, dependent fuse blow manager 906 may be configured to determine whether the received PIN is correct. In this regard, if TPM state previously-passed-PIN indicator 822 is set to true, dependent fuse blow manager 906 may be configured to blow a fuse or not blow a fuse depending on whether the received PIN is incorrect or correct respectively. In instances when the received PIN is not correct, dependent fuse blow manager 906 may proceed to step 1014.

In step 1014, a fuse may be blown and blown-fuse count 332 may be incremented. For example, if the received PIN is incorrect, dependent fuse blow manager 906 may be configured to blow a fuse of the plurality of fuses 112 (e.g., control fuse voltage 122 to blow the fuse) and increment blown fuse count 332 in on-die RAM 814.

In step 1012, in instances where the received PIN is correct, dependent fuse blow manager 906 may not blow a fuse as shown in step 1016.

As can be seen in steps 1010-1016, if TPM state previously-passed-PIN indicator 822 is set to true, dependent fuse blow manager 906 is configured to blow a fuse dependent on whether a received PIN is incorrect, and may not blow a fuse when the received PIN is correct (e.g., using the conservative fuse usage method).

In step 1010, in instances where the value of the received PIN has not been previously received and verified as correct during the current session, TPM logic 810 may be configured to proceed to step 1022. For example, TPM logic 810 may proceed to step 1022 if TPM state previously-passed-PIN indicator 822 is set to false.

In step 1022, a fuse may be blown and the blown fuse count may be incremented. For example, independent fuse blow manager 908 may be configured to blow a fuse of plurality of programmable fuses 112 and increment blown-fuse count 332.

As can be seen in steps 1010-1016, if TPM state previously-passed-PIN indicator 822 is set to false, independent fuse blow manager 908 is configured to blow a fuse independent of whether a received PIN is correct or incorrect (e.g., using the aggressive fuse usage method).

Subsequent to performing steps 1014, 1016, or 1022, TPM logic 810 may proceed to step 1018.

In step 1018, the TPM state fuse count may be set based on the blown fuse count in the on-die RAM. For example, TPM logic 810 may be configured to set TPM state fuse count 336 based on (e.g., equal to) the value of blown-fuse count 332.

Figure 11:
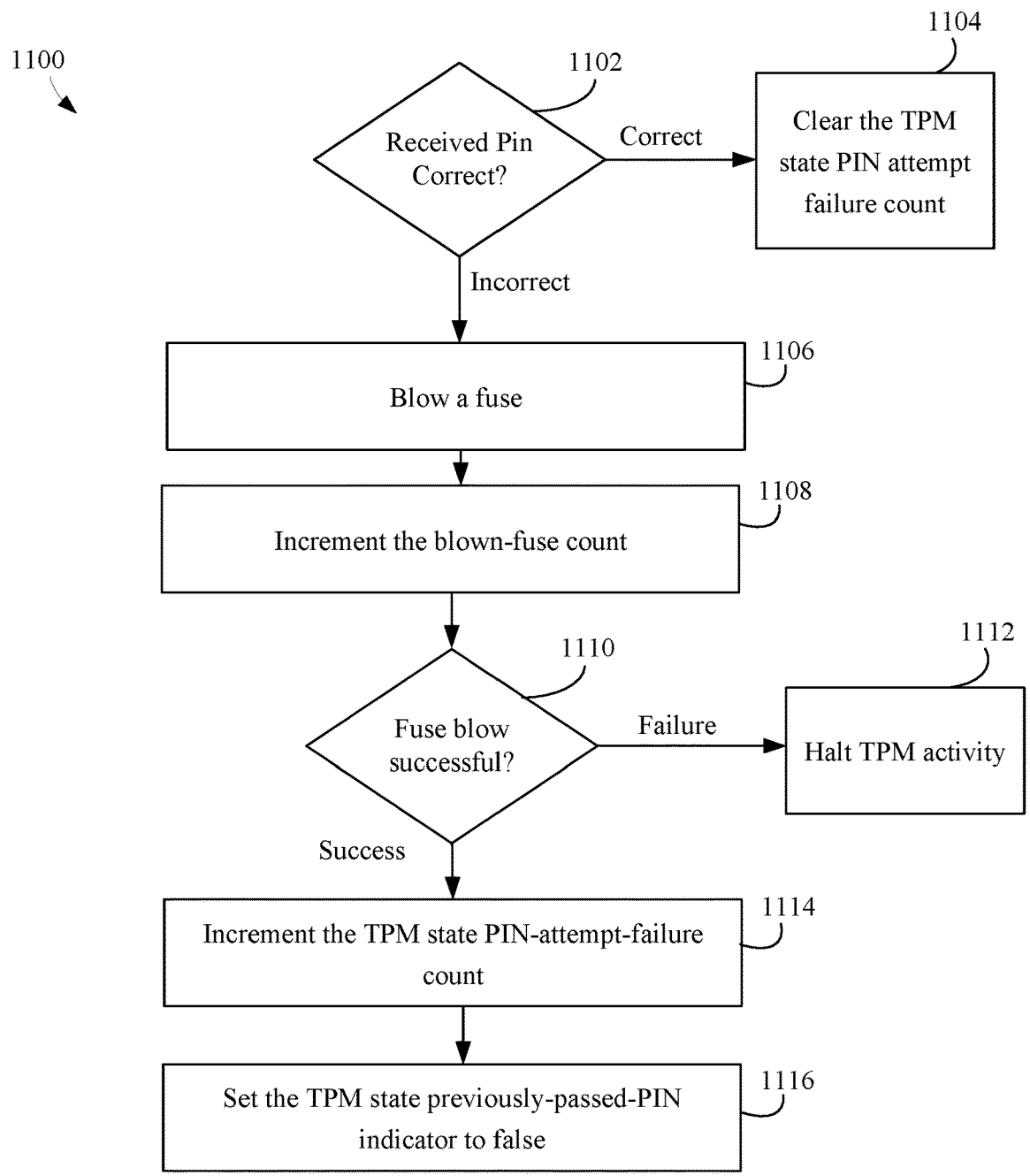
FIG. 11 is a flowchart of a method for dynamically implementing conservative fuse usage, according to an example embodiment.

Dependent fuse blow manager 906 may operate in various ways to perform its functions. For instance, FIG. 11 is a flowchart 1100 of a method for dynamically implementing conservative fuse usage, according to an example embodiment. Flowchart 1100 may be performed as part of flowchart 1000 (FIG. 10), such as after step 1010 results in a "true" output, and before step 1018. In an embodiment, dependent fuse blow manager 906 of TPM logic 810 may operate according to flowchart 1100. Flowchart 1100 is described as follows with reference to FIGS. 8 and 9.

Flowchart 1100 begins with step 1102. In step 1102, in instances where dependent fuse blow manager 906 determines that the received PIN is correct, dependent fuse blow manager 906 may proceed to step 1104.

In step 1104, dependent fuse blow manager 906 may be configured to clear TPM state PIN-attempt-failure count 338.

In step 1102, in instances where dependent fuse blow manager 906 determines that the received PIN is incorrect, dependent fuse blow manager 906 may proceed to step 1106.

In step 1106, dependent fuse blow manger 906 may be configured to blow a fuse of plurality of programmable fuses 112 in response to the PIN being incorrect.

In step 1108, dependent fuse blow manager 906 may increment blown-fuse count 332 in response to blowing the fuse of the plurality of programmable fuses.

In step 1110, in instances where the fuse blow is fails, dependent fuse blow manger 906 may be configured to proceed to step 1112.

In step 1112, dependent fuse blow manger 906 may be configured to halt activity of TPM 106. For example, as described above, dependent fuse blow manager 906 may be configured to halt TPM 106 activity and may place TPM 106 in a failure state, in response to a fuse failing to blow. As described above, an unsuccessful fuse blow may indicate a fuse voltage cut attack has occurred.

In step 1110, in instances where the fuse blow is successful, dependent fuse blow manger 906 may be configured to proceed to step 1114.

In step 1114, dependent fuse blow manager 906 may be configured to increment TPM state PIN-attempt-failure count 338 in response to blowing the fuse for the incorrect PIN.

In step 1116, dependent fuse blow manger 906 may be configured to set TPM state previously-passed-PIN indicator 822 to false.

Figure 12:
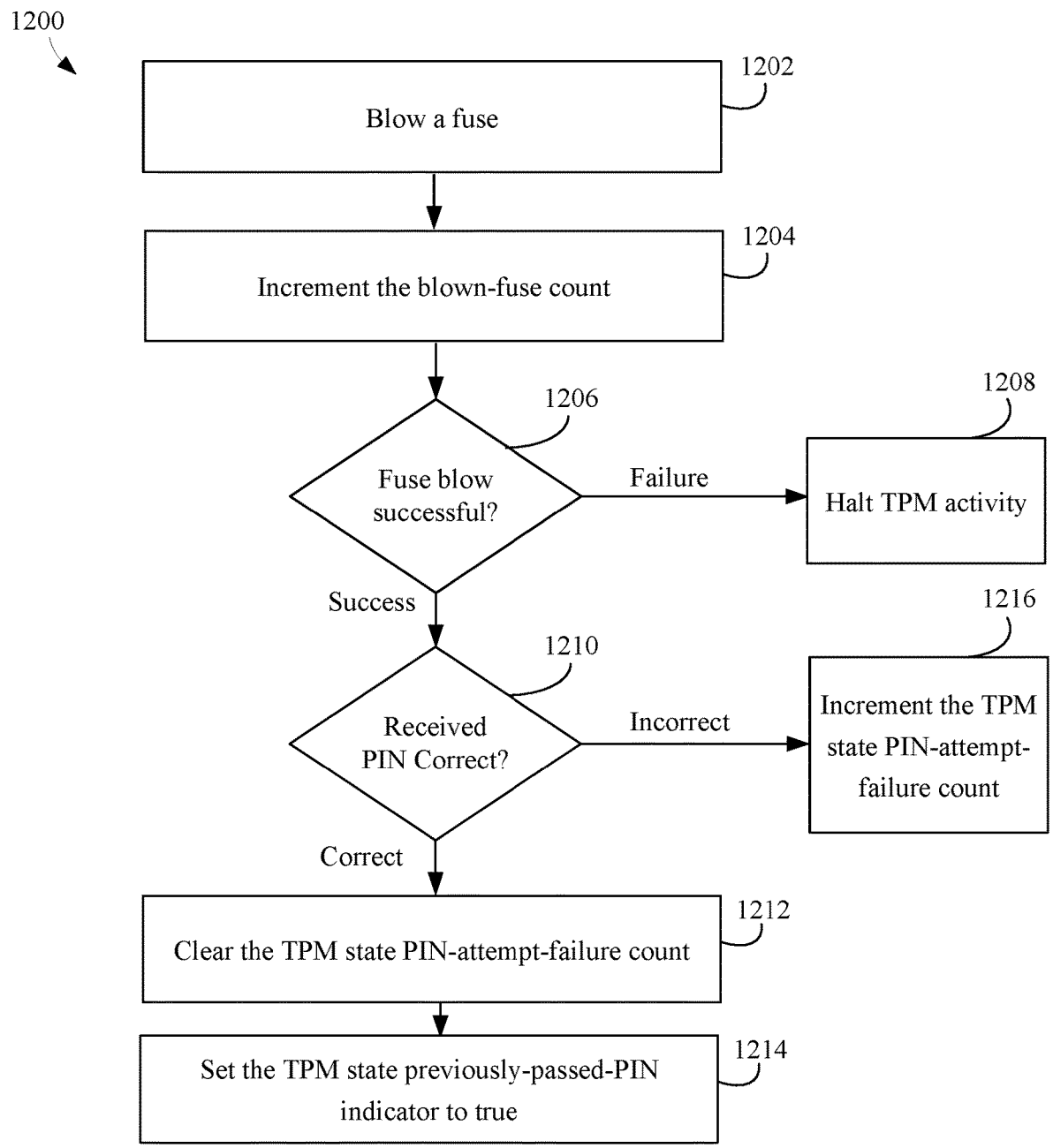
FIG. 12 is a flowchart of a method for dynamically implementing aggressive fuse usage, according to an example embodiment.

Independent fuse blow manager 908 may operate in various ways to perform its functions. For instance, FIG. 12 is a flowchart 1200 of a method for dynamically implementing aggressive fuse usage, according to an example embodiment. Flowchart 1200 may be performed as part of flowchart 1000 (FIG. 10), such as after step 1010 results in a "false" output and before step 1018. In an embodiment, independent fuse blow manager 908 of TPM logic 810 may operate according to flowchart 1200. Flowchart 1200 is described as follows with reference to FIGS. 8 and 9.

In step 1202, independent fuse blow manager 908 may be configured to blow a fuse of plurality of programmable fuses 112 independent of whether a received PIN may be deemed correct or incorrect. For example, independent fuse blow manager 908 may be configured to control fuse voltage 122 to blow the fuse. However, the disclosure is not limited with respect to how the fuse is blown.

In step 1204, independent fuse blow manager 908 may be configured to increment blown-fuse count 332 in response to blowing the fuse of the plurality of programmable fuses 112.

In step 1206, in instances where the fuse blow fails, independent fuse blow manger 908 may be configured to proceed to step 1208.

In step 1208, independent fuse blow manger 908 may be configured to halt activity of TPM 106. For example, independent fuse blow manger 908 may be configured to halt TPM 106 activity and may place TPM 106 in a failure state, in response to a fuse failing to blow. As described above, an unsuccessful fuse blow may indicate a fuse voltage cut attack has occurred.

In step 1206, in instances where the fuse blow is successful, independent fuse blow manger 908 may be configured to proceed to step 1210.

In step 1210, in instances where independent fuse blow manger 908 determines that the received PIN is correct, independent fuse blow manger 908 may proceed to step 1212.

In step 1212, independent fuse blow manger 908 may be configured to clear TPM state PIN-attempt-failure count 338 (e.g., to zero) in response to the received PIN being correct.

In step 1214, independent fuse blow manger 908 may be configured to set TPM state previously-passed-PIN indicator 822 to true for the received PIN in response to the received PIN being correct. In this manner, in the next cycle of receiving the same PIN, the conservative fuse usage method may be utilized rather than the aggressive fuse usage method.

Figure 13:
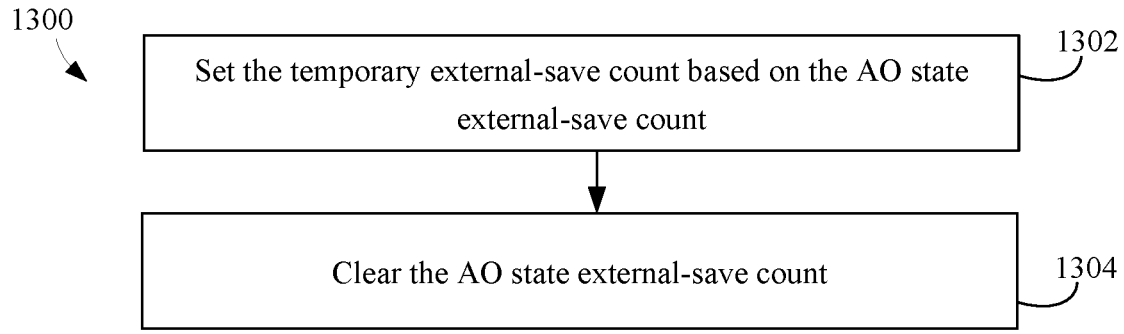
FIG. 13 is a flowchart of a method for setting a trap to catch a fuse voltage cut attack during a subsequent TPM logic initialization, according to an example embodiment.

TPM logic 810 may operate in various ways to perform its functions. For instance, FIG. 13 is a flowchart 1300 of a method for setting a trap to catch a fuse voltage cut attack during a subsequent TPM logic initialization, according to an example embodiment. Flowchart 1300 may be performed as part of flowchart 1000 (FIG. 10), such as after step 1004. In an embodiment, TPM logic 810 may operate according to flowchart 1300. Flowchart 1300 is described as follows with reference to FIGS. 8 and 9.

Flow chart 1300 begins with step 1302. In step 1302, TPM logic 810 may be configured to set temporary external-save count 818 based on the AO state external-save count 816. For example, temporary external-save count 818 may be set equal to AO state external-save count 816.

In step 1304, TPM logic 810 may be configured to clear AO state external-save count 818. For example, AO state external-save count 818 may be set to zero.

Figure 14:
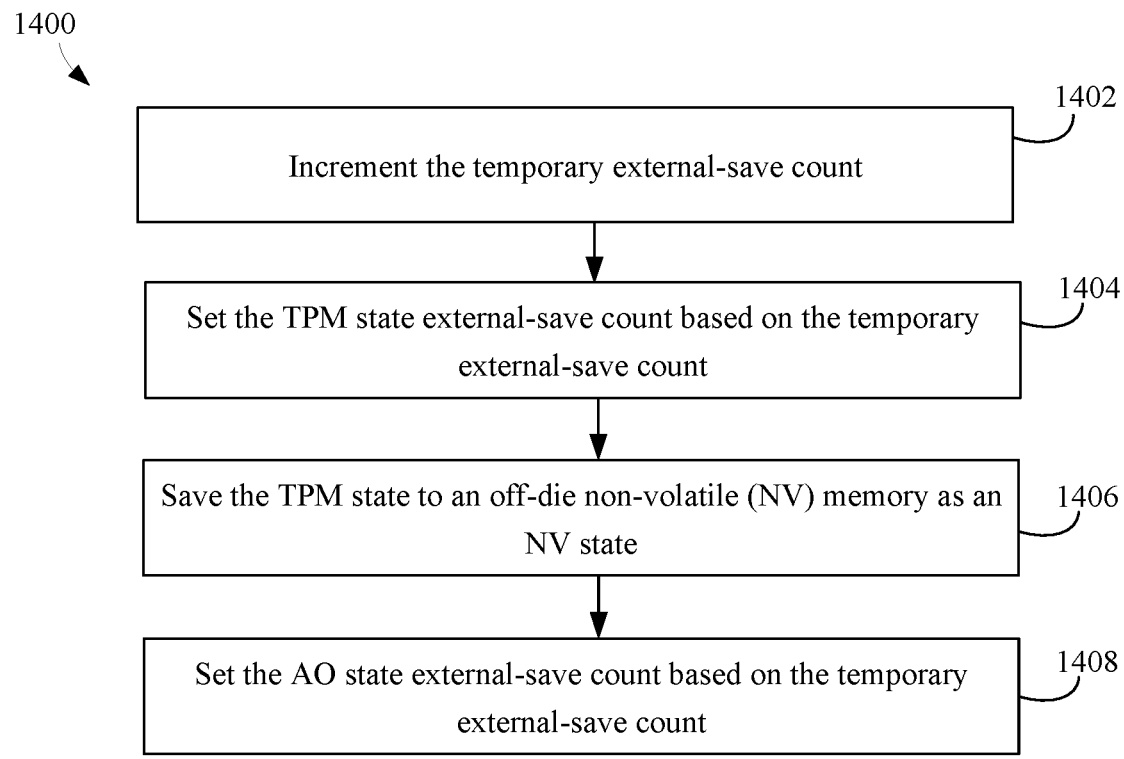
FIG. 14 is a flowchart of a method for saving TPM state variables to NV memory and updating external-save counts, according to an example embodiment.

TPM logic 810 may operate in various ways to perform its functions. For instance, FIG. 14 is a flowchart 1400 of a method for saving TPM state variables to NV memory and updating external-save counts, according to an example embodiment. Flowchart 1300 may be performed as part of flowchart 1000 (FIG. 10), such as after step 1018. In an embodiment, TPM logic 810 may operate according to flowchart 1400. Flowchart 1400 is described as follows with reference to FIGS. 8 and 9.

Flow chart 1400 begins with step 1402. In step 1402, TPM logic 810 may be configured to increment temporary external-save count 818.

In step 1404, TPM logic 810 may be configured to set TPM state external-save count 820 based on temporary external-save count 818. For example, TPM state external-save count 820 may be set equal to temporary external-save count 818.

In step 1406, TPM logic 810 may be configured to save TPM state 834 to off-die NV memory 104 as NV state 840. In some embodiments, if TPM state fuse count 336, PIN-attempt-failure count 338, or previously-passed-PIN indicator 822 have not been changed since the last save to NV state 840, TPM logic may be configured to skip step 1402.

In step 1408, TPM logic 810 may be configured to set AO state external-save count 816 based on temporary external-save count 818.

The initialization process for TPM logic 810 may begin with the steps described with respect to steps 502-504 of flowchart 500 if an NV state 840 read is successful. In this regard, initialization manager 904 may be configured to perform the steps of flowchart 500 and may read NV state 840 comprising NV state fuse count 342, NV state PIN-attempt-failure count 346, NV state external-save count 824, NV state previously-passed-PIN indicator 826, and NV state PIN-key table 348 from off-die NV memory 104, and update TPM state 834 with the NV state 840 values.

Moreover, the initialization process for TPM logic 810 may begin with the steps described with respect to steps 602-608 of flowchart 600 if the NV state 840 read fails. In this regard, initialization manager 904 may be configured to perform the steps of flowchart 600 including reading NV state 840 from off-die NV memory 104. If the NV state 840 read fails, initialization manager 904 may be configured to clear TPM state 834 (e.g., clear TPM state fuse count 336, TPM state PIN-attempt-failure count 338, TPM state external-save count 820, TPM state previously-passed-PIN indicator 822, and TPM state PIN-key table 330 to zero or to a nulled state), and set TPM state fuse count 336 based on blown fuse count 332. These initialization steps may precede the steps described below with respect to FIG. 15.

Figure 15:
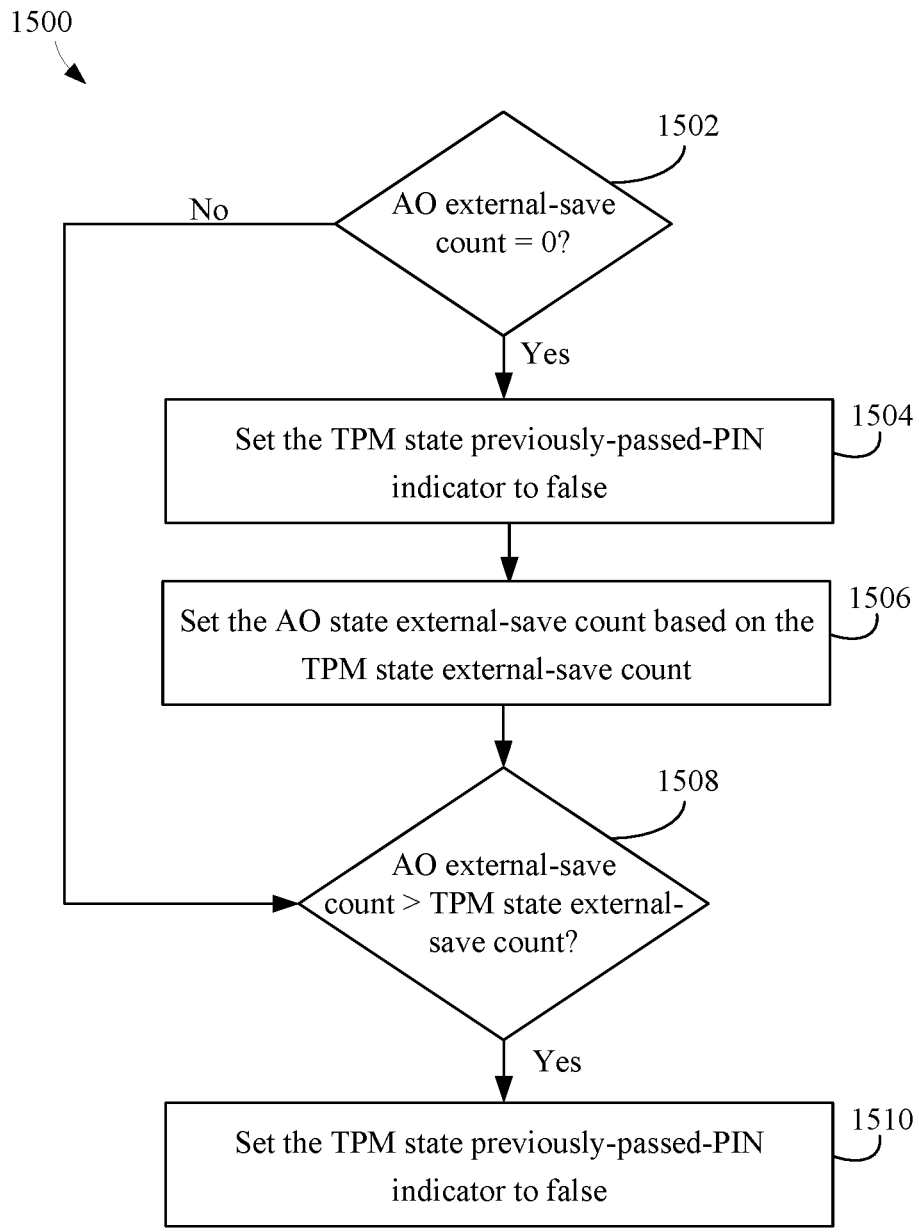
FIG. 15 is a flowchart of a method for initialization the TPM and enforcing penalties for state replay attacks and fuse voltage cut attacks, according to an example embodiment.

Countermeasure manager 910 may operate in various ways to perform its functions. For instance, FIG. 15 is a flowchart 1500 of a method for initializing the TPM and enforcing penalties for state replay attacks and fuse voltage cut attacks, according to an example embodiment. Flowchart 1500 may be performed as part of flowchart 1000 (FIG. 10), such as before step 1004 of the initialization process, and after the initialization steps described above with respect to flowcharts 500 and 600 (as performed by initialization manager 904). In an embodiment, TPM logic 810 may operate according to flowchart 1500. Flowchart 1500 is described as follows with reference to FIGS. 8 and 9.

Flow chart 1500 begins with step 1502. In step 1502, countermeasure manager 910 may be configured to determine whether AO external-save count 816 is set to zero. In instances where AO external-save count 816 is set to zero, countermeasure manager 910 may proceed to step 1504 (this may indicate that a fuse voltage cut attack occurred).

In step 1504, countermeasure manager 910 may be configured to set TPM state previously-passed-PIN indicator 822 to false.

In step 1506, countermeasure manager 910 may be configured to set AO state external-save count 816 based on TPM state external-save count 820. For example, AO state external-save count 816 may be set equal to TPM state external-save count 820.

In step 1508, countermeasure manager 910 may be configured to determine whether the value of AO external-save count 816 is greater than the value of TPM state external-save count 820. In instances where the value of AO external-save count 816 is greater than the value of TPM state external-save count 820, countermeasure manager 910 may proceed to step 1510 (this may indicate a state replay attack).

In step 1510, countermeasure manager 910 may be configured to set TPM state previously-passed-PIN indicator 822 to false.

With reference to flowchart 15, if an attacker perpetrates an attack for a PIN that has previously passed verification in a current session (e.g., previously verified to be correct), the attacker may get one free PIN attempt. The attacker may achieve this by cutting fuse voltage 122 to prevent TPM logic from blowing a fuse before step 1106 in flowchart 1100.

When the TPM system starts up again, since the fuse was not blown and blown-fuse count 332 was not incremented, step 1004 is not executed (to increment TPM state PIN-attempt-failure count 338). However, because in step 1304, AO state external save count 816 was cleared (which occurs before step 1010 of FIG. 10), steps 1502-1506 may be executed during initialization, upon restart of TPM 106 (e.g., where TPM state previously-passed-PIN indicator 822 is set to false). This will force subsequent PIN tries to go into the aggressive fuse usage method described with respect to flowchart 1200, where a fuse may be blown ahead of the determining whether a PIN is correct. At this point, the attacker may be forced to blow a fuse for each and every PIN attempt and eventually will get caught by the PIN-attempt-failure count policy 902.

D. Pseudo-Code Examples of (1) Fuse Based Replay Protection with conservative Fuse Usage, (2) Fuse Based Replay Protection with aggressive Fuse Usage, and (3) Fuse Based Replay Protection with Dynamic Fuse Usage and Countermeasures for Fuse Voltage Cut Attacks Pseudo-Code Notation:

Fuse.Counter (e.g., blown-fuse-count 332): This variable represents the current counter value held in the programmable fuses. Each extra fuse blow increments this counter by 1.

AOState: This state represents the Always-On SRAM (e.g., AO RAM 812) state that is powered by the always on rail (e.g., AO power rail 830).

AOState.MonotonicCounter (e.g., AO state external-save count 816): This may be a 4 byte value held in the always on SRAM (e.g., AO RAM 812), which may be incremented every time NVState (e.g., TPM state 834) is stored to flash (e.g., off-die NV memory 104). This value may revert back to 0 when always on power is lost. By keeping this counter in always-on SRAM, it makes it harder for the attacker to replay an old NVState (e.g., NV state 840) at the TPM without getting caught.

SRAM.MonotonicCounter (e.g., temporary external-save count 818): This is a variable in TPM SRAM (e.g., on-die RAM 814) used to temporarily hold AOState.MonotonicCounter (e.g., AO state external-save count 816) when needed.

NVState (e.g., TPM state 834): This represents the internal SRAM state used to hold what will be stored to off-die NV storage (e.g., off-die NV memory 104). The algorithm will describe when this SRAM state is read from and written to external NV storage.

NVState.FuseCounter (e.g., TPM state fuse count 336): this is a current counter value held in NVState (TPM state 334 or 834). This value is typically equal to Fuse.Counter (e.g., blown-fuse count 332) but could lag behind Fuse.Counter depending on the situation.

NVState.MonotonicCounter (e.g., TPM state external save count 820): the current monotonic counter value held in NVState (e.g., TPM state 834). This value is typically equal to AOState.MonotonicCounter (e.g., AO state external-save count 816). If NVState.MonotonicCounter is less than AOState.MonotonicCounter, then it could indicate a replay attack.

NVState.PINFailCount[ ](e.g., TPM state PIN-attempt-failure count 338): This is an array of integers that is used to store the number of failed PIN attempts for each specific PIN. An upper bound is assumed for the number of PINs allowed in the TPM and the index into this array is used to specify the specific PIN.

NVState.PINPassed[ ] (e.g., previously-passed-PIN indicator 822): This is an array of Boolean flags that is used to remember whether a specific PIN has already been successfully used during the current always-on session.

Fuse Based Replay Protection with Conservative Fuse Usage:

The following steps are performed upon TPM initialization:

1. Read NVState from external NV flash
2. If cannot read NVState, then treat it as a new TPM after TPM clear, and perform initialization
   a. Set NVState.FuseCounter=Fuse. Counter
   b. Set NVState. PINFailCount[X] to 0 for all X
3. If NVState.FuseCounter is less than Fuse.Counter, then
   a. Add (Fuse.Counter−NVState.FuseCounter) to NVState.PINFailCount[X] for all X The following steps are performed for every PIN try, assume PIN number X is attempted:

4. Read NVState.PINFailCount[X] and apply TPM PIN Failure policy
5. Test if PIN X is correct
   a. If PIN is correct
      i. Set NVState.PINFailCount[X] to 0
   b. If PIN is incorrect, blow fuse to increment Fuse.Counter
      i. If fuse blow fails, put TPM in failure state and HALT all further TPM activity
      ii. NVState.PINFailCount[X]++
6. Set NVState.FuseCounter=Fuse.Counter
7. Save NVState to external NV flash This method uses NVState.FuseCounter (e.g., TPM state fuse count 336) to also store the counter value from the blown fuses. Step 3 covers the case where an attacker is replaying an old NVState (TPM state 334) to lower the PINFailCount (TPM state PIN-attempt-failure count 338). In a NVState replay scenario, the Fuse.Counter (e.g., blown-fuse count 332) value will have advanced to a larger number than the replayed NVState.FuseCounter (e.g., TPM state fuse count 336). Thus, the replay attacker is penalized by adding (Fuse.Counter−NVState.FuseCounter) (e.g., blown-fuse count 332−TPM state fuse count 336) to every NVState.PINFailCount (TPM state PIN-attempt-failure count 338), thus making the attacker gain nothing by replaying NVState (TPM state 334).

However, the attacker can monitor voltage draw for the fuse blow in step 5b and cut power to prevent the fuse blow from happening. The fact that the extra voltage draw happened, tells the attacker that the PIN was incorrect. The attacker can then restart the system before the fuse gets blown and start all over again. Since Fuse.Counter (e.g., blown-fuse count 332) was never incremented, step 3 doesn't catch the attacker, and thus the attacker can keep repeating this process until the correct PIN is eventually discovered.

Fuse Based Replay Protection with Aggressive Fuse Usage (Fuse Blow Per PIN Attempt):

The following steps are performed upon TPM initialization:

1. Read NVState from external NV flash
2. If cannot read NVState, then treat it as a new TPM after TPM clear, and perform initialization
   a. Set NVState.FuseCounter=Fuse.Counter
   b. Set NVState. PINFailCount[X] to 0 for all X
3. If NVState.FuseCounter is less than Fuse.Counter, then
   a. Add (Fuse.Counter−NVState.FuseCounter) to NVState.PINFailCount[X] for all X The following steps are performed for every PIN try, assume PIN number X is attempted:

4. Read NVState.PINFailCount[X] and apply TPM PIN Failure policy
5. Blow fuse to increment Fuse.Counter
6. If fuse blow fails, put TPM in failure state and HALT all further TPM activity
7. Test if PIN X is correct
   a. If PIN is correct, Set NVState.PINFailCount[X] to 0
   b. If PIN is incorrect, NVState.PINFailCount[X]++
8. Set NVState.FuseCounter=Fuse. Counter
9. Save NVState to external NV flash This algorithm is secure against attacks but utilizes a fuse blow every time a PIN is tried, even if the PIN is correct Fuse Based Replay Protection with Dynamic Fuse Usage and Countermeasures for Fuse Voltage Cut Attacks:

The following steps are performed upon TPM initialization:

1. Read NVState from external NV flash

2. If cannot read NVState, then treat it as a new TPM after TPM clear, and perform initialization
   a. Set NVState.FuseCounter=Fuse.Counter
   b. Set NVState.PINFailCount[X] to 0 for all X
3. If AOState.MonotonicCounter==0 then
   a. Set NVState.PINPassed[X] to false for all X
   b. AOState.MonotonicCounter=NVState.MonotonicCounter
4. If AOState.MonotonicCounter>NVState.MonotonicCounter then
   a. Set NVState.PINPassed[X] to false for all X
5. If NVState.FuseCounter is less than Fuse.Counter, then
   a. Add (Fuse.Counter−NVState.FuseCounter) to NVState.PINFailCount[X] for all X The following steps are performed for every PIN try, assume PIN number X is attempted:

6. Read NVState.PINFailCount[X] and apply TPM PIN Failure policy
7. SRAM.MonotonicCounter=AOState.MonotonicCounter
8. AOState.MonotonicCounter=0. I/Forces reboot into step 3 if steps 9-12 are interrupted
9. If NVState.PINPassed[X] is true then test if PIN X is correct
   a. If PIN is correct
      i. Set NVState.PINFailCount[X] to 0
   b. If PIN is incorrect, blow fuse to increment Fuse-.Counter
      i. If fuse blow fails, put TPM in failure state and HALT all further TPM activity
      ii. NVState.PINFailCount[X]++
      iii. Set NVState.PINPassed[X] to false
10. Else II NVState.PINPassed[X] is false
    a. blow fuse to increment Fuse.Counter
    b. If fuse blow fails, put TPM in failure state and HALT all further TPM activity
    c. Test if PIN X is correct
       i. If PIN is correct
          1. Set NVState.PINFailCount[X] to 0
          2. Set NVState.PINPassed[X] to true
       ii. If PIN is incorrect, NVState.PINFailCount[X]++
11. NVState.FuseCounter=Fuse.Counter
12. If there was any change in NVState FuseCounter, PINFailCount[ ], or PINPassed[ ] then
    a. SRAM.MonotonicCounter=SRAM.MonotonicCounter+1//increment for NVState save
    b. NVState.MonotonicCounter=SRAM.MonotonicCounter
    c. Save NVState to external NV flash
13. AOState.MonotonicCounter=SRAM.MonotonicCounter
14. Return PIN try result from TPM This method leverages the always on state to conserve fuse usage while also keeping the algorithm secure against replay attacks.

The spirit of this method is to keep track of whether a PIN has been successfully verified before, and if it has, use the less secure algorithm that doesn't require a fuse blow for each PIN try. But in the case of a PIN that has not been successfully verified before, use the more secure algorithm that blows a fuse for each PIN attempt.

AOState.MonotonicCounter is also used to record a monotonic counter so that NVState (e.g., TPM state 834) rollback can be detected. AOState.MonotonicCounter (e.g., AO state external-save count 816) should revert back to 0 if always-on power is lost.

If an attacker tries to attack with a PIN that has previously passed, the attacker will get one free PIN try. The attacker can achieve this by pulling power to prevent fuse blow in step 9b. When the system starts up again, the Fuse.Counter (e.g., blown-fuse count 332) was not incremented so step 5a does not get executed. However, because step 8 cleared the AOState.MonotonicCounter (e.g., AO state external-save count 816) value before step 9, step 3 will be executed upon restart. This will force subsequent PIN tries to go into step 10 where a fuse is blown ahead of the test. At this point, the attacker may be forced to blow a fuse for each and every PIN try, and will get caught in step 6 sooner or later.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, systems 100, 300, 800, and 900 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SOC), a field programmable gate array (FPGA), an application specific integrated circuit (ASIC), a trusted platform module (TPM), and/or the like. A SOC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 16:
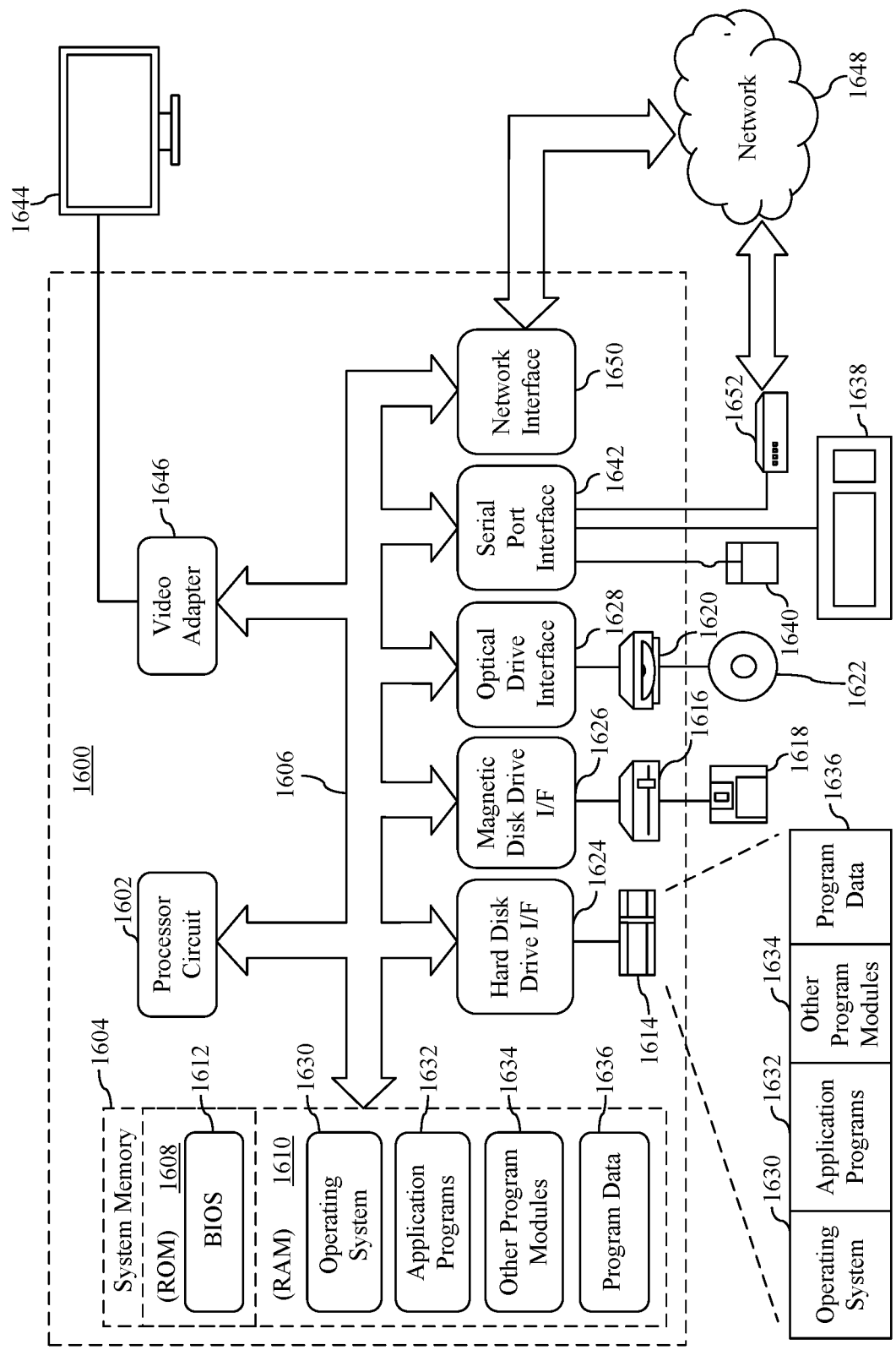
FIG. 16 is a block diagram of an example processor-based computer system that may be used to implement various embodiments.

FIG. 16 is a block diagram of an example processor-based computer system 1600 that may be used to implement various embodiments. Systems 100, 300, 800, and 900 may each include any type of computing device, mobile or stationary, such as a desktop computer, a server, a video game console, etc. For example, systems 100, 300, 800, and 900 may each comprise any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

Systems 100, 300, 800, and 900, may each be implemented in one or more computing devices containing features similar to those of computing device 1600 in stationary or mobile computer embodiments and/or alternative features. The description of computing device 1600 provided herein is provided for purposes of illustration, and is not intended to be limiting. Embodiments may be implemented in further types of computer systems, as would be known to persons skilled in the relevant art(s).

As shown in FIG. 16, computing device 1600 includes one or more processors, referred to as processor circuit 1602, a system memory 1604, and a bus 1606 that couples various system components including system memory 1604 to processor circuit 1602. Processor circuit 1602 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1602 may execute program code stored in a computer readable medium, such as program code of operating system 1630, application programs 1632, other programs 1634, etc. Bus 1606 represents one or more of any of several types of bus structures, including a memory bus or memory controller, a peripheral bus, an accelerated graphics port, and a processor or local bus using any of a variety of bus architectures. System memory 1604 includes read only memory (ROM) 1608 and random-access memory (RAM) 1610. A basic input/output system 1612 (BIOS) is stored in ROM 1608.

Computing device 1600 also has one or more of the following drives: a hard disk drive 1614 for reading from and writing to a hard disk, a magnetic disk drive 1616 for reading from or writing to a removable magnetic disk 1618, and an optical disk drive 1620 for reading from or writing to a removable optical disk 1622 such as a CD ROM, DVD ROM, or other optical media. Hard disk drive 1614, magnetic disk drive 1616, and optical disk drive 1620 are connected to bus 1606 by a hard disk drive interface 1624, a magnetic disk drive interface 1626, and an optical drive interface 1628, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1630, one or more application programs 1632, other programs 1634, and program data 1636. Application programs 1632 or other programs 1634 may include, for example, computer program logic (e.g., computer program code or instructions) for implementing TPM logic 110 or 810, initialization manager 322, dependent fuse blow manager 324, independent fuse blow manager 326, TPM state 334, programmable fuses 112, NV state 340, always-on RAM 812, PM state 834, NV state 840, PIN-attempt-failure count policy 902, initialization manager 904, dependent fuse blow manager 908, countermeasure manager 910, and any one or more of flowcharts 200, 400, 500, 600, 700, 1000, 1100, 1200, 1300, 1400, 1500 (including any step thereof), and/or further embodiments described herein. Program data 1636 may include, blown-fuse count 332, TPM state 334, TPM state fuse count 336, PIN-attempt-failure count 338, NV state 340, NV state fuse count 342, NV state PIN-attempt-failure count 346, AO state external-save count 816, temporary external-save count 818, TPM state 834, TPM state external-save count 820, TPM state previously-passed-PIN indicator 822, NV state external-save count 824, NV state previously-passed-PIN indicator 826, and/or further embodiments described herein.

A user may enter commands and information into computing device 1600 through input devices such as keyboard 1638 and pointing device 1640. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1602 through a serial port interface 1642 that is coupled to bus 1606, but may be connected by other interfaces, such as a parallel port, game port, or a universal serial bus (USB).

A display screen 1644 is also connected to bus 1606 via an interface, such as a video adapter 1646. Display screen 1644 may be external to, or incorporated in computing device 1600. Display screen 1644 may display information, as well as being a user interface for receiving user commands and/or other information (e.g., by touch, finger gestures, virtual keyboard, etc.). In addition to display screen 1644, computing device 1600 may include other peripheral output devices (not shown) such as speakers and printers.

Computing device 1600 is connected to a network 1648 (e.g., the Internet) through an adaptor or network interface 1650, a modem 1652, or other means for establishing communications over the network. Modem 1652, which may be internal or external, may be connected to bus 1606 via serial port interface 1642, as shown in FIG. 16, or may be connected to bus 1606 using another interface type, including a parallel interface.

As used herein, the terms "computer program medium," "computer-readable medium," and "computer-readable storage medium" are used to refer to physical hardware media such as the hard disk associated with hard disk drive 1614, removable magnetic disk 1618, removable optical disk 1622, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1632 and other programs 1634) may be stored on the hard disk, magnetic disk, optical disk, ROM, RAM, or other hardware storage medium. Such computer programs may also be received via network interface 1650, serial port interface 1642, or any other interface type. Such computer programs, when executed or loaded by an application, enable computing device 1600 to implement features of embodiments discussed herein. Accordingly, such computer programs represent controllers of computing device 1600.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a system for thwarting personal identification number (PIN) retry attacks in a trusted platform module (TPM) comprises a system on a chip (SOC). The SOC comprises a plurality of programmable fuses, one or more processors, and one or more memory devices. The one or more memory devices comprise an on-die random access memory (RAM) storing a blown-fuse count comprising a count of currently blown fuses of the plurality of programmable fuses and a TPM state. The TPM state comprises a TPM state fuse count, a TPM state PIN-attempt-failure count, and a TPM state previously-passed-PIN indicator. The one or more memory devices stores program code to be executed by the one or more processors. The program code comprises TPM logic. The TPM logic is configured to initialize the TPM. The initialization comprises, at least: in response to the blown-fuse count being greater than the TPM state fuse count, incrementing the TPM state PIN-attempt-failure count. The TPM logic is further configured to receive a PIN in a PIN attempt for accessing a system protected by the TPM. In response to the TPM state PIN-attempt-failure count satisfying a PIN-attempt-failure count policy, the TPM logic is configured to: in response to the TPM state previously-passed-PIN indicator being set to true, blow a fuse and increment the blown-fuse count in response to the received PIN being incorrect, or in response to the TPM state previously-passed-PIN indicator being set to false, blow a fuse and increment the blown-fuse count independent of whether the received PIN is determined to be correct or incorrect. The TPM logic is further configured to set the TPM state fuse count based on the blown-fuse count and return a PIN attempt result.

In an embodiment of the foregoing system, to blow the fuse and increment the blown-fuse count in response to the received PIN being incorrect, the TPM logic is configured to: in response to the received PIN being correct, clear a TPM state PIN-attempt failure count and in response to the received PIN being incorrect, blow the fuse and increment the blown-fuse count. In response to the fuse blow failing, the TPM logic is configured to halt TPM activity, and in response to the fuse blow succeeding, the TPM logic is configured to increment the TPM state PIN-attempt-failure count and set the TPM state previously-passed-PIN indicator to false.

In an embodiment of the foregoing system, to blow the fuse and increment the blown-fuse count independent of whether the received PIN is determined to be correct or incorrect, the TPM logic is configured to blow the fuse and increment the blown-fuse count. In response to the fuse blow failing, the TPM logic is configured to halt TPM activity. In response to the fuse blow succeeding, the TPM logic is configured to: in response to the received PIN being correct, clear the TPM state PIN-attempt-failure count and set the TPM state previously-passed-PIN indicator to true, and in response to the received PIN being incorrect, increment the TPM state PIN-attempt-failure count.

In an embodiment of the foregoing system the TPM further comprises an always-on (AO) RAM storing an AO state external-save count, the on-die RAM further stores a temporary external-save count, and the TPM state stored on the on-die RAM further comprises a TPM state external-save count.

In an embodiment of the foregoing system the TPM logic is further configured to, in response to receiving the PIN in the PIN attempt, set the temporary external-save count based on the AO state external-save count and clear the AO state external-save count. Subsequent to setting the TPM state fuse count based on the blown-fuse count in the on-die RAM, the TPM logic is further configured to save the TPM state to an off-die non-volatile (NV) memory as an NV state, increment the temporary external-save count, set the TPM state external-save count based on the temporary external-save count, and set the AO state external-save count based on the temporary external-save count.

In an embodiment of the foregoing system the saving of the TPM state to an off-die non-volatile (NV) memory as an NV state, the incrementing of temporary external-save count, the setting of the TPM state external-save count based on the temporary external-save count, and the setting of the AO state external-save count based on the temporary external-save count, are performed in response to any of the TPM state fuse count, the TPM state PIN-attempt-failure count, or the TPM state previously-passed-PIN indicator being changed.

In an embodiment of the foregoing system, to initialize the TPM, the TPM is further configured to read the NV state from the off-die NV memory. In response to reading the NV state from the off-die NV memory, the TPM logic is configured to write the NV state information into the on-die RAM as the TPM state or in response to a failure in reading the NV state from the off-die NV memory, the TPM logic is configured to reset the TPM state to a cleared initial state, and set TPM state fuse count based on the blown-fuse count.

In an embodiment of the foregoing system, to initialize the TPM, the TPM logic is further configured to, in response to the AO state external-save count being set to zero, set the TPM state previously-passed-PIN indicator to false and set the AO state external-save count based on the TPM state external-save count. In response to the AO state external-save count being greater than the TPM state external-save count, the TPM logic is configured to set the TPM state previously-passed-PIN indicator to false.

In an embodiment of the foregoing system, the TPM logic is configured to determine correctness of a plurality of different PIN values.

In an embodiment of the foregoing system, the TPM state comprises a plurality of TPM state PIN-attempt-failure counts in a TPM state PIN-attempt-failure count array and a plurality of TPM state previously-passed-PIN indicators in a TPM state previously-passed-PIN indicator array. The plurality of TPM state PIN-attempt-failure counts and the plurality of TPM state previously-passed-PIN indicators are associated with a plurality of respective different PIN values utilized in accessing the system protected by the TPM.

In an embodiment of the foregoing system, the SOC further comprises a central processing unit (CPU).

In an embodiment, a method for thwarting personal identification number (PIN) retry attacks in a trusted platform module (TPM) is implemented in a system on a chip (SOC). The TPM comprises a plurality of programmable fuses and an on-die random access memory (RAM) storing a blown-fuse count comprising a count of currently blown fuses of the plurality of programmable fuses and a TPM state. The TPM state comprises a TPM state fuse count, a TPM state PIN-attempt-failure count, and a TPM state previously-passed-PIN indicator. The method comprises initializing the TPM. Initializing the TPM comprises at least, in response to the blown-fuse count being greater than the TPM state fuse count, incrementing the TPM state PIN-attempt-failure count. The method further comprises receiving a PIN in a PIN attempt for accessing a system protected by the TPM. In response to the TPM state PIN-attempt-failure count satisfying a PIN-attempt-failure count policy, the method comprises: in response to the TPM state previously-passed-PIN indicator being set to true, blowing a fuse and incrementing the blown-fuse count in response to the received PIN being incorrect, or in response to the TPM state previously-passed-PIN indicator being set to false, blowing a fuse and incrementing the blown-fuse count independent of whether the received PIN is determined to be correct or incorrect. The method further comprises setting the TPM state fuse count based on the blown-fuse count, and returning a PIN attempt result.

In an embodiment of the foregoing method, the blowing of a fuse and incrementing the blown-fuse count in response to the received PIN being incorrect comprises: in response to the received PIN being correct, clearing a TPM state PIN-attempt failure count, and in response to the received PIN being incorrect, blowing a fuse and incrementing the blown-fuse count. In response to the fuse blow failing, the method comprises halting TPM activity. In response to the fuse blow succeeding, the method comprises incrementing the TPM state PIN-attempt-failure count and setting the TPM state previously-passed-PIN indicator to false.

In an embodiment of the foregoing method, the blowing of a fuse and incrementing the blown-fuse count independent of whether the received PIN is determined to be correct or incorrect comprises blowing the fuse and incrementing the blown-fuse count. In response to the fuse blow failing, the method comprises halting TPM activity. In response to the fuse blow succeeding, the method comprises: in response to the received PIN being correct, clearing the TPM state PIN-attempt-failure count and setting the TPM state previously-passed-PIN indicator to true, and in response to the received PIN being incorrect, incrementing the TPM state PIN-attempt-failure count.

In an embodiment of the foregoing method, the TPM further comprises an always-on (AO) RAM storing an AO state external-save count, the on-die RAM further stores a temporary external-save count, and the TPM state stored on the on-die RAM further comprises a TPM state external-save count.

In an embodiment of the foregoing method, the method further comprises in response to receiving the PIN in the PIN attempt, setting the temporary external-save count based on the AO state external-save count and clearing the AO state external-save count. Subsequent to setting the TPM state fuse count based on the blown-fuse count in the on-die RAM, the method comprises saving the TPM state to an off-die non-volatile (NV) memory as an NV state and incrementing the temporary external-save count. The method further comprises setting the TPM state external-save count based on the temporary external-save count, and setting the AO state external-save count based on the temporary external-save count.

In an embodiment of the foregoing method, the initializing of the TPM further comprises reading the NV state from the off-die NV memory. In response to reading the NV state from the off-die NV memory, the method comprises writing the NV state information into the on-die RAM as the TPM state. In response to a failure in reading the NV state from the off-die NV memory, the method comprises resetting the TPM state to a cleared initial state, and setting TPM state fuse count based on the blown-fuse count.

In an embodiment of the foregoing method, the initializing of the TPM further comprises: in response to the AO state external-save count being set to zero, setting the TPM state previously-passed-PIN indicator to false and setting the AO state external-save count based on the TPM state external-save count, and in response to the AO state external-save count being greater than the TPM state external-save count, setting the TPM state previously-passed-PIN indicator to false.

In an embodiment, a computer-readable medium has program code recorded thereon that when executed by at least one processor causes the at least one processor to perform a method for thwarting personal identification number (PIN) retry attacks in a trusted platform module (TPM) implemented in a system on a chip (SOC). The SOC comprises a plurality of programmable fuses and an on-die random access memory (RAM) storing a blown-fuse count comprising a count of currently blown fuses of the plurality of programmable fuses and a TPM state. The TPM state comprises a TPM state fuse count, a TPM state PIN-attempt-failure count, and a TPM state previously-passed-PIN indicator. The method comprises initializing the TPM that comprises at least, in response to the blown-fuse count being greater than the TPM state fuse count, incrementing the TPM state PIN-attempt-failure count. The method further comprises receiving a PIN in a PIN attempt for accessing a system protected by the TPM. In response to the TPM state PIN-attempt-failure count satisfying a PIN-attempt-failure count policy, the method comprises: in response to the TPM state previously-passed-PIN indicator being set to true, blowing a fuse and incrementing the blown-fuse count in response to the received PIN being incorrect, or in response to the TPM state previously-passed-PIN indicator being set to false, blowing a fuse and incrementing the blown-fuse count independent of whether the received PIN is determined to be correct or incorrect. The method further comprises setting the TPM state fuse count based on the blown-fuse count, and returning a PIN attempt result.

In an embodiment of the foregoing computer readable medium, the blowing of a fuse and incrementing the blown-fuse count in response to the received PIN being incorrect comprises: in response to the received PIN being correct, clearing a TPM state PIN-attempt-failure count and in response to the received PIN being incorrect, blowing the fuse and incrementing the blown-fuse count. In response to the fuse blow failing, the method comprises halting TPM activity, and in response to the fuse blow succeeding, the method comprises incrementing the TPM state PIN-attempt-failure count and setting the TPM state previously-passed-PIN indicator to false. The blowing of a fuse and incrementing the blown-fuse count independent of whether the received PIN is determined to be correct or incorrect comprises blowing the fuse and incrementing the blown-fuse count. In response to the fuse blow failing, the method comprises halting TPM activity. In response to the fuse blow succeeding the method comprises: in response to the received PIN being correct, clearing the TPM state PIN-attempt-failure count and setting the TPM state previously-passed-PIN indicator to true, and in response to the received PIN being incorrect, incrementing the TPM state PIN-attempt-failure count.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A system on a chip (SOC) comprising:
a trusted platform module (TPM);
programmable fuses;
a processor;
an on-die random access memory (RAM) storing:
  a blown-fuse count indicating a count of currently blown fuses of the programmable fuses;
  a TPM state for the TPM, wherein the TPM state indicates:
    a fuse count; and
    a personal identification number (PIN)-attempt-failure count; and
  computer executable instructions that, when executed, perform operations comprising:
    in response to the blown-fuse count being greater than the fuse count, incrementing the PIN-attempt-failure count;
    receiving a PIN in an attempt to access a system protected by the TPM;
    determining the PIN-attempt-failure count for the PIN satisfies a PIN-attempt-failure count policy;
    in response to determining the PIN is incorrect:
      blowing a fuse; and
      incrementing the blown-fuse count; and
      setting the fuse count based on the blown-fuse count.

2. The SOC of claim 1, wherein the TPM is communicatively coupled to an off-die non-volatile (NV) memory that serves as a long-term memory.

3. The SOC of claim 2, the operations further comprising:
prior to incrementing the PIN-attempt-failure count, reading NV state from the off-die NV memory, the NV state corresponding to the TPM state; and
writing the NV state into the TPM state.

4. The SOC of claim 2, wherein the off-die NV memory stores the fuse count and the PIN-attempt-failure count.

5. The SOC of claim 4, wherein the off-die NV memory further stores a PIN-key table that is populated with authorized PINs and respective cryptographic keys.

6. The SOC of claim 5, wherein a respective cryptographic key of the respective cryptographic keys is provided when a correct PIN is received by the TPM, the respective cryptographic key enabling access to the system protected by the TPM.

7. The SOC of claim 1, wherein the programmable fuses are one-time programmable fuses stored on the TPM.

8. The SOC of claim 1, wherein the PIN-attempt-failure count policy indicates a PIN attempt threshold specifying a maximum number of PIN attempts permitted for the PIN.

9. The SOC of claim 8, wherein, when the maximum number of PIN attempts permitted for the PIN has been reached, access to the system protected by the TPM is denied for at least a predefined amount of time.

10. The SOC of claim 1, the operations further comprising:
prior to determining the PIN is incorrect, determining whether a previously-passed-PIN value for the PIN indicates that the PIN was previously verified to be correct.

11. The SOC of claim 10, the operations further comprising:
in response to determining the previously-passed-PIN value for the PIN indicates that the PIN was previously verified to be correct, determining whether the PIN is correct.

12. The SOC of claim 1, the operations further comprising:
after setting the fuse count based on the blown-fuse count, returning a PIN try result indicating whether the attempt to access the system protected by the TPM is successful.

13. A trusted platform module (TPM) comprising:
programmable fuses;
an on-die random access memory (RAM) storing:
  a blown-fuse count indicating a count of currently blown fuses of the programmable fuses;
  a TPM state indicating:
    a fuse count; and
    a personal identification number (PIN)-attempt-failure count; and
  computer executable instructions that, when executed, perform operations comprising:
    in response to the blown-fuse count being greater than the fuse count, incrementing the PIN-attempt-failure count;
    receiving a PIN in an attempt to access a system protected by the TPM;
    determining a previously-passed-PIN value for the PIN indicates that the PIN was previously verified to be correct;
    determining the PIN is incorrect;
    blowing a fuse in the programmable fuses;
    incrementing the blown-fuse count; and
    setting the fuse count based on the blown-fuse count.

14. The TPM of claim 13, the TPM further comprising:
a TPM logic storing a PIN-attempt-failure count policy specifying a maximum number of PIN attempts permitted for the PIN.

15. The TPM of claim 14, the TPM logic further storing an initialization manager that initializes the TPM by updating or clearing information stored on the on-die RAM.

16. The TPM of claim 14, the TPM logic further storing a fuse blow manager that is responsible for blowing the fuse in the programmable fuses.

17. The TPM of claim 16, wherein blowing the fuse in the programmable fuses comprises increasing a power level provided to the fuse beyond a fuse voltage threshold for the fuse.

18. The TPM of claim 13, wherein determining the PIN is incorrect comprises:
comparing the PIN to one or more authorized PINs stored by the TPM; and determining the PIN does not match the one or more authorized PINs.

19. The TPM of claim 13, wherein the previously-passed-PIN value indicates whether the PIN has been verified since the TPM was last rebooted.

20. A method comprising:
accessing a trusted platform module (TPM) implemented by a system on a chip (SOC), the TPM comprising an on-die random access memory (RAM) storing:
  a blown-fuse count indicating a count of blown fuses in programmable fuses associated with the TPM; and
  a TPM state comprising a fuse count and a personal identification number (PIN)-attempt-failure count;
receiving a PIN in an attempt to access a system protected by the TPM;
determining the PIN-attempt-failure count for the PIN satisfies a PIN-attempt-failure count policy;
in response to determining the PIN is incorrect, blowing a fuse of the programmable fuses;
incrementing the blown-fuse count; and
setting the fuse count based on the blown-fuse count.

* * * * *